(12) United States Patent
Bookstaff et al.

(10) Patent No.: US 8,254,548 B2
(45) Date of Patent: *Aug. 28, 2012

(54) METHOD AND SYSTEM FOR PROVIDING DIRECTORY ASSISTANCE TO ERRONEOUS TELEPHONE CALLS

(76) Inventors: Blake Bookstaff, Knoxville, TN (US);
James J. Sonnick, Rochester, NY (US);
Michael G. Thorpe, Fairport, NY (US);
Daniel E. Gallagher, Fairport, NY (US)

( * ) Notice: Subject to any disclaimer, the term of this patent is extended or adjusted under 35 U.S.C. 154(b) by 676 days.

This patent is subject to a terminal disclaimer.

(21) Appl. No.: 12/364,660

(22) Filed: Feb. 3, 2009

(65) Prior Publication Data

US 2009/0175433 A1    Jul. 9, 2009

Related U.S. Application Data

(63) Continuation-in-part of application No. 11/805,531, filed on May 23, 2007, now Pat. No. 7,573,993, which is a continuation of application No. 10/064,402, filed on Jul. 10, 2002, now Pat. No. 7,227,936.

(51) Int. Cl.
*H04M 3/42* (2006.01)
*H04M 3/493* (2006.01)
*H04M 3/52* (2006.01)

(52) U.S. Cl. ......... 379/218.01; 379/201.01; 379/211.01; 379/213.01

(58) Field of Classification Search ............. 379/201.01, 379/204.01, 211.01, 212.01, 213.01, 218.01
See application file for complete search history.

(56) References Cited

U.S. PATENT DOCUMENTS

| | | |
|---|---|---|
| 3,928,724 A | 12/1975 | Byram et al. |
| 4,053,949 A | 10/1977 | Recca et al. |
| 4,071,698 A | 1/1978 | Barger, Jr. et al. |
| 4,232,199 A | 11/1980 | Boatwright |
| 4,446,337 A | 5/1984 | Cofer |
| 4,451,704 A | 5/1984 | Winkelman |
| 4,608,460 A | 8/1986 | Carter et al. |
| 4,654,482 A | 3/1987 | DeAngelis |
| 4,791,666 A | 12/1988 | Cobb et al. |
| 4,850,007 A | 7/1989 | Marino et al. |
| 4,897,866 A | 1/1990 | Majmudar |
| 4,918,719 A | 4/1990 | Daudelin |
| 4,943,995 A | 7/1990 | Daudelin et al. |
| 4,959,855 A | 9/1990 | Daudelin |
| 4,975,941 A | 12/1990 | Morganstein et al. |

(Continued)

FOREIGN PATENT DOCUMENTS

EP     1 383 275 A1     7/2002

(Continued)

OTHER PUBLICATIONS

PCT Search Report PCT/US2010/022, 179.

(Continued)

*Primary Examiner* — Harry Hong
(74) *Attorney, Agent, or Firm* — Lesavich High-Tech Law Group, P.C.; Stephen Lesavich

(57) ABSTRACT

A method and system for providing directory assistance to erroneous calls. The method and system includes an intercept system that intercepts erroneous calls and automatically routes them to a directory assistance service. The directory assistance service provides a least one advertisement and a variety of other services to the callers using a rule-based expert system service.

17 Claims, 9 Drawing Sheets

U.S. PATENT DOCUMENTS

| | | | |
|---|---|---|---|
| 4,979,206 A | 12/1990 | Padden et al. |
| 5,131,024 A | 7/1992 | Pugh |
| 5,377,354 A | 12/1994 | Scannell |
| 5,425,097 A | 6/1995 | Pula |
| 5,448,625 A | 9/1995 | Lederman |
| 5,473,671 A | 12/1995 | Partridge, III |
| 5,475,746 A | 12/1995 | Miller |
| 5,485,511 A | 1/1996 | Iglehart |
| 5,515,098 A | 5/1996 | Carles |
| 5,544,236 A | 8/1996 | Andruska |
| 5,619,562 A | 4/1997 | Maurer |
| 5,642,407 A | 6/1997 | He |
| 5,652,784 A | 7/1997 | Blen et al. |
| 5,661,788 A | 8/1997 | Chin |
| 5,701,419 A | 12/1997 | McConnell |
| 5,734,710 A | 3/1998 | Hirth |
| 5,751,802 A | 5/1998 | Carr et al. |
| 5,757,899 A | 5/1998 | Boulware et al. |
| 5,802,149 A | 9/1998 | Hanson |
| 5,825,862 A | 10/1998 | Voit et al. |
| 5,835,570 A | 11/1998 | Wattenbarger |
| 5,852,775 A | 12/1998 | Hidary |
| 5,873,032 A | 2/1999 | Cox et al. |
| 5,875,231 A | 2/1999 | Farfan et al. |
| 5,878,338 A | 3/1999 | Alperovich et al. |
| 5,880,770 A | 3/1999 | Ilcisin et al. |
| 5,892,820 A | 4/1999 | Armstrong |
| 5,943,410 A | 8/1999 | Shaffer |
| 5,966,437 A | 10/1999 | Cox |
| 5,983,544 A | 11/1999 | Fagan |
| 5,987,424 A | 11/1999 | Nakamura |
| 6,009,161 A | 12/1999 | Babbitt et al. |
| 6,031,904 A | 2/2000 | An |
| 6,035,190 A | 3/2000 | Cox et al. |
| 6,038,307 A | 3/2000 | Fahrer et al. |
| 6,061,439 A | 5/2000 | Bleile |
| 6,084,628 A | 7/2000 | Sawyer |
| 6,104,786 A | 8/2000 | Gibilisco et al. |
| 6,118,860 A | 9/2000 | Hillson et al. |
| 6,178,446 B1 | 1/2001 | Gerszberg et al. |
| 6,188,751 B1 | 2/2001 | Scherer |
| 6,198,812 B1 | 3/2001 | Weber |
| 6,205,215 B1 | 3/2001 | Dombakly |
| 6,256,515 B1 | 7/2001 | Cox et al. |
| 6,301,338 B1 | 10/2001 | Makela |
| 6,301,342 B1 | 10/2001 | Ander et al. |
| 6,310,948 B1 | 10/2001 | Nemeth |
| 6,324,273 B1 | 11/2001 | Alcott |
| 6,327,343 B1 | 12/2001 | Epstein et al. |
| 6,327,344 B1 | 12/2001 | Paxson |
| 6,347,225 B1 | 2/2002 | Nishiyama |
| 6,353,852 B1 | 3/2002 | Nestoriak, III et al. |
| 6,381,320 B1 | 4/2002 | Creamer et al. |
| 6,393,423 B1 | 5/2002 | Goedken |
| 6,400,804 B1 | 6/2002 | Bilder |
| 6,456,709 B1 | 9/2002 | Cox et al. |
| 6,473,612 B1 | 10/2002 | Cox et al. |
| 6,504,912 B1 | 1/2003 | Glossbrenner |
| 6,516,311 B1 | 2/2003 | Yacoby |
| 6,587,138 B1 | 7/2003 | Vogt et al. |
| 6,587,549 B1 | 7/2003 | Weik |
| 6,590,970 B1 | 7/2003 | Cai et al. |
| 6,597,769 B2 | 7/2003 | Snow |
| 6,614,896 B1 | 9/2003 | Rao |
| 6,618,474 B1 | 9/2003 | Reese |
| 6,633,850 B1 | 10/2003 | Gabbard |
| 6,668,281 B1 | 12/2003 | Ayyadurai |
| 6,718,551 B1 | 4/2004 | Swix et al. |
| 6,856,673 B1 | 2/2005 | Banks et al. |
| 6,965,919 B1 | 11/2005 | Woods et al. |
| 6,977,997 B2 | 12/2005 | Shioda et al. |
| 7,013,323 B1 | 3/2006 | Thomas |
| 7,100,199 B2 | 8/2006 | Ginter |
| 7,187,761 B2 | 3/2007 | Bookstaff |
| 7,227,936 B2 | 6/2007 | Bookstaff |
| 7,573,993 B2 | 8/2009 | Bookstaff |
| 7,720,828 B2 | 5/2010 | Bookstaff |
| 2001/0012344 A1 | 8/2001 | Kwon |
| 2002/0044639 A1 | 4/2002 | Shioda |
| 2002/0049968 A1 | 4/2002 | Wilson |
| 2002/0051521 A1 | 5/2002 | Patrick |
| 2002/0091566 A1 | 7/2002 | Siegel |
| 2002/0107730 A1 | 8/2002 | Bernstein |
| 2002/0193095 A1 | 12/2002 | Hutcheson |
| 2002/0194061 A1 | 12/2002 | Himmel |
| 2003/0007620 A1 | 1/2003 | Elsey |
| 2003/0023542 A1 | 1/2003 | Kemp |
| 2003/0033198 A1 | 2/2003 | Flannery et al. |
| 2003/0041126 A1 | 2/2003 | Buford |
| 2003/0050837 A1 | 3/2003 | Kim |
| 2003/0063721 A1 | 4/2003 | Hirose |
| 2003/0097325 A1 | 5/2003 | Friesen |
| 2003/0161464 A1 | 8/2003 | Rodriguez et al. |
| 2003/0177063 A1 | 9/2003 | Currans et al. |
| 2003/0191689 A1 | 10/2003 | Bosarge et al. |
| 2003/0212710 A1 | 11/2003 | Guy |
| 2003/0223563 A1 | 12/2003 | Wolmuth |
| 2003/0231754 A1 | 12/2003 | Stein et al. |
| 2003/0233313 A1 | 12/2003 | Bartolucci |
| 2004/0008834 A1 | 1/2004 | Bookstaff |
| 2004/0039786 A1* | 2/2004 | Horvitz et al. ............... 709/207 |
| 2004/0059708 A1 | 3/2004 | Dean et al. |
| 2004/0107125 A1* | 6/2004 | Guheen et al. ............... 705/7 |
| 2005/0075966 A1 | 4/2005 | Duka |
| 2005/0165670 A1 | 7/2005 | Woodmansey |
| 2005/0182673 A1 | 8/2005 | Marzian et al. |
| 2005/0216457 A1 | 9/2005 | Walther |
| 2005/0256799 A1 | 11/2005 | Warsaw |
| 2005/0289113 A1 | 12/2005 | Bookstaff |
| 2006/0080215 A1 | 4/2006 | Warsaw |
| 2006/0129474 A1 | 6/2006 | Kelly |
| 2006/0155626 A1 | 7/2006 | Wigzell |
| 2006/0161495 A1 | 7/2006 | Wigzell |
| 2006/0161524 A1 | 7/2006 | Roy |
| 2006/0229971 A1 | 10/2006 | Kelly |
| 2006/0253371 A1 | 11/2006 | Rutt |
| 2007/0038549 A1 | 2/2007 | Janowski |
| 2007/0043647 A1 | 2/2007 | Bickford |
| 2007/0106654 A1 | 5/2007 | Bookstaff |
| 2007/0130030 A1 | 6/2007 | Bookstaff |
| 2007/0253544 A1 | 11/2007 | Bookstaff |
| 2009/0168987 A1 | 7/2009 | Bookstaff |
| 2009/0175431 A1 | 7/2009 | Bookstaff |
| 2009/0175433 A1 | 7/2009 | Bookstaff |

FOREIGN PATENT DOCUMENTS

| | | |
|---|---|---|
| EP | 1 662 366 A1 | 5/2006 |
| WO | WO 00/38399 A | 6/2000 |
| WO | WO 01/47264 A | 6/2001 |
| WO | WO 2004/044866 A | 11/2003 |
| WO | WO 2004/042525 A | 4/2004 |
| WO | WO 2004/029759 A | 5/2004 |
| WO | WO 2006/005001 A2 | 1/2006 |
| WO | WO 2007/024868 A | 3/2007 |
| WO | WO 2008/073270 A1 | 6/2008 |

OTHER PUBLICATIONS

PCT Search Report PCT/US2010/022, 184.
PCT Search Report PCT/US2010/022, 212.
Partial PCT Search Report PCT/US2007/024,995.
Partial PCT Search Report PCT/US2005/023,495.
Partial PCT Search Report PCT/US2003/035,617.
Partial European Search Report EP 08 01 8481 Dated: Nov. 28, 2008.

* cited by examiner

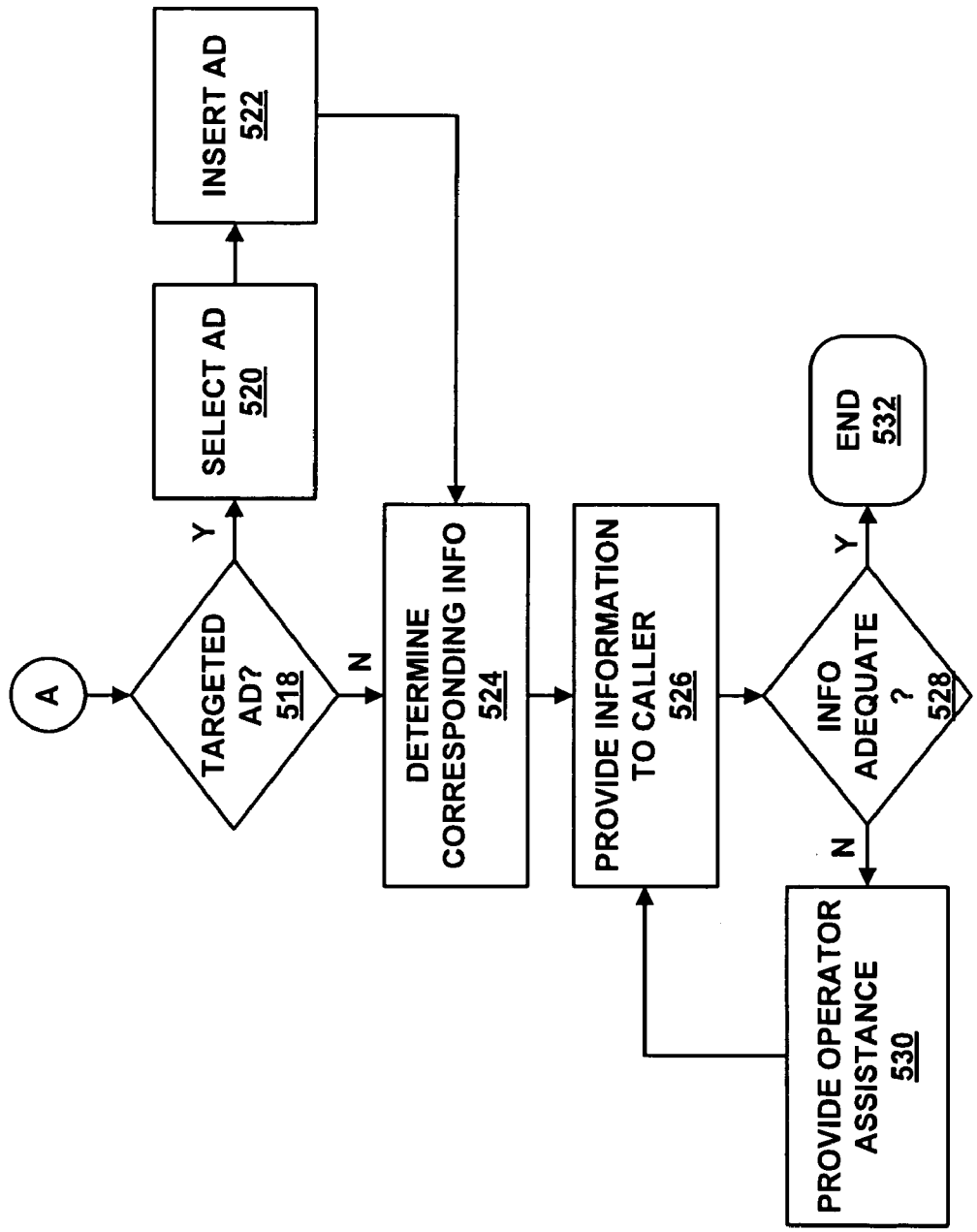

METHOD AND SYSTEM FOR PROVIDING DIRECTORY ASSISTANCE TO ERRONEOUS TELEPHONE CALLS

CROSS REFERENCE TO RELATED APPLICATIONS

This application is a Continuation-In-Part (CIP) of U.S. application Ser. No. 11/805,531, filed May 23, 2007, that issued as U.S. Pat. No. 7,573,993, on Aug. 11, 2009, which is a Continuation of U.S. application Ser. No. 10/064,402, filed on Jul. 10, 2002, that issued as U.S. Pat. No. 7,227,936, on Jun. 5, 2007, the contents of all of which are incorporated by reference.

FIELD OF INVENTION

The present invention relates generally to intercepting erroneous telephone calls, and more particularly to providing directory assistance and other services to a caller who makes a telephone call to an unavailable or erroneous telephone number for which a telephony company may have limited information.

BACKGROUND OF THE INVENTION

Telephone systems, such as the public switched telephone network (PSTN), often intercept calls attempted by a customer that cannot be completed as dialed for any of a variety of reasons, such as a disconnected subscriber, the dialed number being out of service, or the dialed number being reserved for other uses. The telephone system typically directs the caller to an intercept system and the intercept system may then communicate the unavailable status of the dialed number to the caller, via a recorded voice message or sequence of tones transmitted back to the caller. For example, the intercept system may playback recording informing a caller that the number cannot be completed as dialed, the number is not serviceable from the caller's area code, the number is not in service, the number is disconnected, that a zero, one, and/or area code should be dialed when calling the number, and the like. Such intercept systems are disclosed, for example, in U.S. Pat. No. 4,446,337 to Cofer and U.S. Pat. No. 4,791,666 to Cobb, et al.

While useful in indicating to the caller that the attempted call cannot be completed as dialed, a limitation common to conventional intercept systems is that they typically provide minimal, if any, additional information regarding the status of the dialed number other than it has been disconnected, out-of-order, or otherwise unavailable. For example, when a caller dials a disconnected number, the recorded message transmitted to the caller over the telephone network generally includes a variation of the phrase: The number you have dialed has been disconnected or is no longer in service. Please check the number and try again. This is followed by a disconnection of the call. Accordingly, the resulting message provides the caller little insight as to why the dialed number is unavailable.

To remedy the situation, the caller typically must disconnect, or hang up, from the call and place a second call to a directory assistance service (DAS) to obtain additional information regarding the unavailable number or to obtain an alternate telephone number, thereby causing considerable inconvenience to the caller. Examples of directory assistance services are disclosed, for example, in U.S. Pat. No. 3,928,724 issued to Byram, et al., U.S. Pat. No. 4,979,206 issued to Padden, et al., U.S. Pat. No. 4,959,855 and U.S. Pat. No. 4,918,719, both issued to Daudelin.

When a call is placed to a directory assistance service, the caller usually provides one or more descriptors, such as a name, telephone number, or address to the service via either an operator or through voice recognition software. The directory assistance service then searches one or more databases for information associated with the descriptors and provides the information, if any, to the caller either via an operator or by an automated voice synthesis system. However, to take advantage of the benefits of directory assistance, the caller generally must have prior knowledge of the specific telephone number used to reach the directory assistance (e.g., 865-555-1212 or 411). To further complicate matters, there are a number of local, regional, and nationwide directory assistance services. Accordingly, a caller unfamiliar with a certain locality or region may not have offhand knowledge of the number used to contact the local or regional directory assistance associated with the area. As a result, the caller typically must spend considerable time and effort in locating the directory assistance number before the caller can obtain information regarding the caller's previously unsuccessful telephone call to the unavailable number.

In view of the limitations of known intercept systems and directory assistance services, a system and method for providing directory assistance to customers attempting to place calls to unavailable numbers would be advantageous.

SUMMARY OF THE INVENTION

In accordance with preferred embodiments of the invention, some of the problems associated with providing directory assistance to customers attempting to place calls to unavailable numbers are overcome. A method and system for providing directory assistance to erroneous calls is presented.

The method and system includes an intercept system that intercepts erroneous calls and automatically routes them to a directory assistance service. The directory assistance service provides a least one advertisement and a variety of other services to the callers using a rule-based expert system service.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 5a and 5b are a flow diagram illustrating an exemplary operation of a system for providing directory assistance to a caller attempting to place an erroneous call in accordance with at least one embodiment of the present invention.

DETAILED DESCRIPTION OF THE PREFERRED EMBODIMENTS

Figure 1:
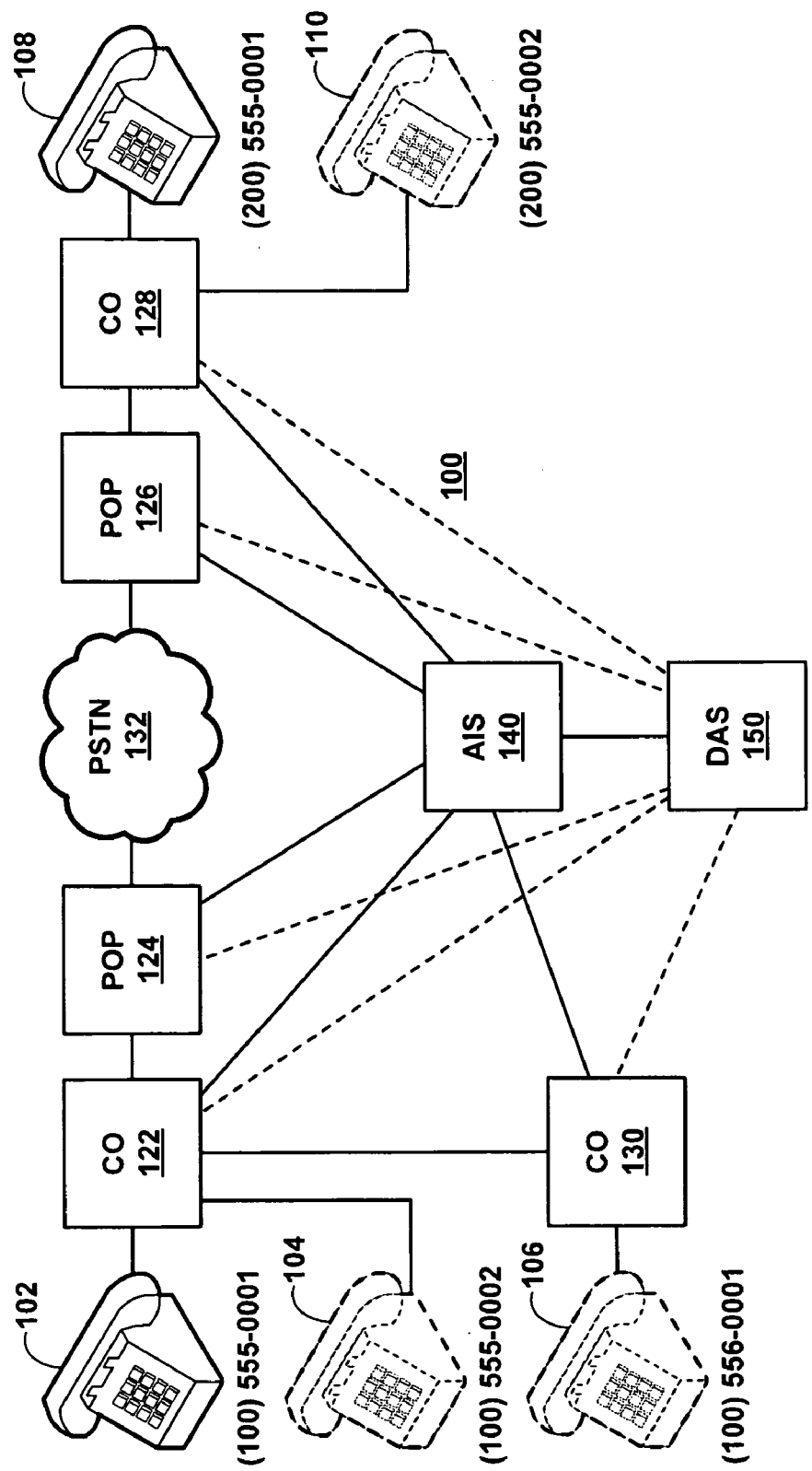
FIGS. 1 and 2 are block diagrams illustrating exemplary mechanisms for routing erroneous calls to a directory assistance service.

FIGS. 1-5 illustrate a system and a method for routing erroneous telephone calls to a directory assistance service for further assistance. An intercept system intercepts these erroneous calls and automatically routes them to a directory assistance service. The directory assistance service then can inform the caller of the unavailable status of the telephone number the caller is attempting to dial. Likewise, the directory assistance service can be adapted to provide any additional information associated with the unavailable number, such as an alternate number associated with the subscriber the caller is attempting to contact, or one or more telephone numbers of other subscribers similar to the intended subscriber. The directory assistance service also can provide additional information regarding the alternate subscribers and/or advertisers. After providing the caller with any associated information, the directory assistance service can be adapted to forward the caller to an alternate telephone number related to the original erroneous telephone number. Furthermore, in at least one embodiment, the directory assistance service can be adapted to provide general or targeted advertisements to the caller in addition to, or instead of, providing directory assistance to the caller.

An operating environment for the components and devices illustrated in FIGS. 1-5 include processing systems with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Figure 2:
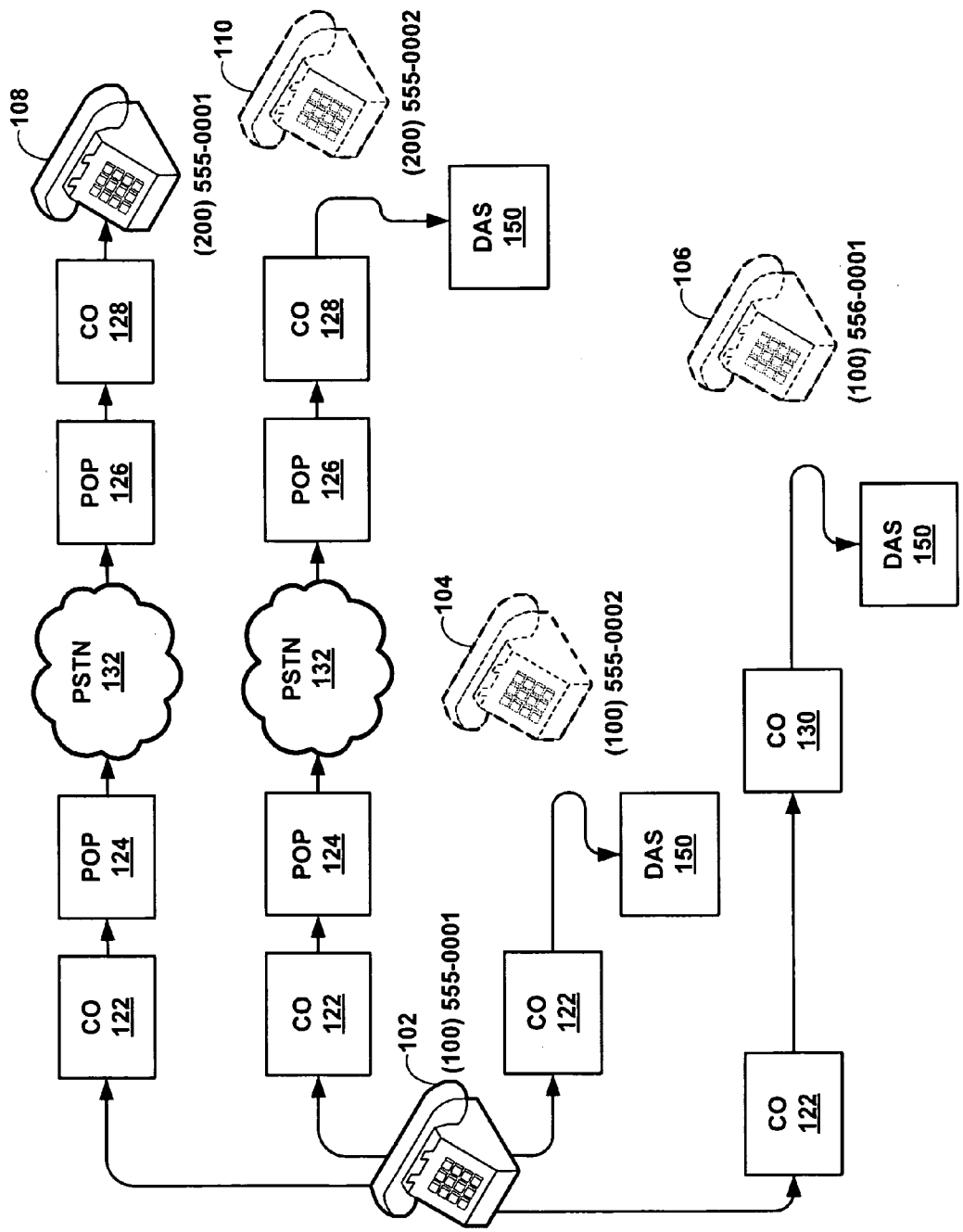

Referring now to FIGS. 1 and 2, mechanisms to automatically route erroneous telephone calls to one or more directory assistance services are illustrated in accordance with at least one embodiment of the present invention. The terms telephone and telephony equipment, as used herein, refer to any of a variety of devices adapted to originate a connection to another device and/or accept a connection from another device via a telephone network, where a telephone network can include a private telephone network, such as private branch exchange (PBX), a public switched telephone network (PSTN), an integrated services digital network (ISDN), a fiber distributed data interface (FDDI) telephone network, a cellular or wireless telephone network, a satellite telephone network, and the like, or a combination thereof.

Likewise, telephone calls can be placed using digital data networks, such as the Internet, and hybrid telephone/digital data networks using techniques such as the Voice-over-Internet Protocol (VoIP) and voice over digital subscriber line (VDSL). Accordingly, a telephone network in accordance with the present invention can include a digital data network conventionally used to carry various types of data, for example, the Internet or a local area network (LAN). Likewise, in this case, a telephone can include a device capable of communicating with a digital data network, for example, a networked personal computer implementing a VoIP software application. For ease of discussion, the implementations of the present invention will be discussed herein with reference to a PSTN. However, the implementations of the present invention can be adapted to other types of telephone networks using the guidelines provided herein.

As is known in the art, VoIP is a set of facilities for managing the delivery of voice information using Internet Protocol (IP) packets. In general, VoIP is used to send voice information in digital form in discrete data packets (i.e., IP packets, User Datagram Protocols (UDP), etc.) over data networks rather than using traditional circuit-switched protocols used on the PSTN. VoIP is used on both wireless and wired data networks.

VoIP typically comprises several applications (e.g., Session Initiation Protocol (SIP), Service Location Protocol (SLP), H.323, H.324, Domain Name System (DNS), Authentication Authorization and Accounting (AAA), codecs (G.7xx), etc.) that convert a voice signal into a stream of packets (e.g., IP packets) on a packet network and back again. VoIP allows voice signals to travel over a stream of data packets over a communications network and/or telephony networks.

The terms to place a telephone call or to make a call and their variations, as used herein, are intended to refer to the act of a caller (a person or an apparatus directed by a person) signaling to a telephone network that a connection is desired between the telephone device of the caller and the telephone device associated with the dialed telephone number. The term "available telephone number" and its variants, as used herein, are intended to refer to a telephone number that is in service and to which calls can successfully be placed. Conversely, the term "unavailable telephone number" and its variants, as used herein, are intended to refer to a telephone number that is not available to the caller for whatever reason and therefore a call placed to the telephone number cannot be completed as dialed. An attempted telephone call placed to an unavailable telephone number is herein referred to as an "erroneous call." Likewise, a caller attempting to place an erroneous call is herein referred to as an erroneous caller.

Reasons for an unavailable telephone number can include, but are not limited to: a disconnected subscriber; the telephone number is out of order; the phone number is reserved for future use; the telephone number is unavailable from the caller's area code; the caller failed to enter a 1, 0, and/or area code before the number; the caller entered a 1, 0, or area code before the number when unnecessary; the line is busy; the area code is incorrect or unavailable, and the like. The attempted telephone call can include, but is not limited to, a local telephone call, a toll call (e.g., 900-XXX-XXXX), a toll-free call (i.e., 800-XXX-XXX, 888-XXX-XXXX, etc.), a long distance call, an international call, a data call using an IP or other network address, and the like. An unavailable telephone number include numbers implemented by the telephone network but, for whatever reason, are unavailable. Additionally, an unavailable telephone number can include numbers that are not implemented by the telephone network (herein non-existent telephone numbers), such as: certain sequences of telephone digits (e.g., 800-1XX-XXXX and 800-XXX-0XXX); numbers that do not exist (065-558-9594); telephone numbers having area codes that are not implemented (e.g., 999-XXX-XXXX); and the like.

The terms to place a telephone call or to make a call and their variations, as used herein, are intended to refer to the act of a caller (a person or an apparatus directed by a person) signaling to a telephone network that a connection is desired between the telephone device of the caller and the telephone device associated with the dialed telephone number. The term available telephone number and its variants, as used herein, are intended to refer to a telephone number that is in service and to which calls can successfully be placed. Conversely, the term unavailable telephone number and its variants, as used herein, are intended to refer to a telephone number that is not available to the caller for whatever reason and therefore a call placed to the telephone number cannot be completed as dialed. An attempted telephone call placed to an unavailable telephone number is herein referred to as an erroneous call. Likewise, a caller attempting to place an erroneous call is herein referred to as an erroneous caller.

Reasons for an unavailable telephone number can include, but are not limited to: a disconnected subscriber; the telephone number is out of order; the phone number is reserved for future use; the telephone number is unavailable from the caller's area code; the caller failed to enter a 1, 0, and/or area code before the number; the caller entered a 1, 0, or area code before the number when unnecessary; the line is busy; the area code is incorrect or unavailable, and the like. The attempted telephone call can include, but is not limited to, a local telephone call, a toll call (e.g., 900-XXX-XXXX), a toll-free call (i.e., 800-XXX-XXX, 888-XXX-XXXX, etc.), a long distance call, an international call, and the like. An unavailable telephone number include numbers implemented by the telephone network but, for whatever reason, are unavailable. Additionally, an unavailable telephone number can include numbers that are not implemented by the telephone network (herein non-existent telephone numbers), such as: certain sequences of telephone digits (e.g., 800-1XX-XXXX and 800-XXX-0XXX); numbers that do not exist (065-558-9594); telephone numbers having area codes that are not implemented (e.g., 999-XXX-XXXX); and the like.

In general, when a caller places a call to a destination telephone number, the telephone network, such as a PSTN, attempts to create a circuit between the originating telephone and the destination telephone. This circuit typically passes through a local central office connected to the originating telephone, through one or more trunk lines and other central offices, until it reaches the remote central office connected to the destination telephone. Additionally, if the call is a long-distance telephone call, the circuit may route through the local point-of-presence (POP) and remote POP of the long distance carrier. To illustrate, if a caller at telephone number (100) 555-0001 (telephone 102) makes a long-distance call to the telephone number (200) 555-0001 (telephone 108), then the circuit between the originating telephone 102 and the destination telephone 108 could include a local central office (CO) 122, a local POP 124, the PSTN 132, a remote POP 126 and the remote CO 128 connected to the telephone 108. Alternatively, if the telephone 102 were to make a call to another telephone connected to the same CO 122, such as telephone 104, the call circuit typically would be routed only through the CO 122. Likewise, if a call were placed to telephone number (100) 556-0001 (telephone 106) on another CO 130 connected to the CO 122 without any intermediary COs between, then the call circuit typically would include at least CO 122 and CO 130. It should be understood that the circuits illustrated in FIGS. 1 and 2 are exemplary only and represent a simplified depiction of the routing associated with such networks.

After a circuit has been generated, or reserved, between the originating telephone and the destination telephone, the originating caller and the person being called can commence their conversation. However, should the caller place an erroneous call to an unavailable number, the telephone network, at some point during the attempted call, routes the erroneous caller to an intercept system, such as the automatic intercept system (AIS) 140 illustrated in FIG. 1. An example automatic intercept system is available under the trade name Distributed Automatic Intercept System 11 from Computer Consoles Incorporated of Rochester, N.Y. Conventional intercept systems then would inform the erroneous caller as to the status of the dialed number by playing a recorded voice message and then disconnect the caller, thereby freeing up the components of the circuit for use in other calls. As a result, the erroneous caller would then have to hang up, locate the number of a directory assistance service that potentially could assist the caller, and then dial the directory assistance service.

However, rather than disconnecting the erroneous caller, in at least one embodiment, a switch within the telephone network, such as at one of COs 122, 128, 130, is adapted to detect and intercept an erroneous call and then automatically forward the erroneous caller to the AIS 140 (as represented by the solid lines connecting to the AIS 140 in FIG. 1).

In this case, the AIS 140 is adapted to route the erroneous caller to a directory assistance service (DAS) 150, whereupon the DAS 150 is adapted to assist the erroneous caller in obtaining directory assistance regarding the unavailable number, such as by providing the status of the dialed number, alternate numbers for the subscriber associated with the unavailable number, and the like. The erroneous caller can then interact with the DAS 150 to obtain the information.

In one embodiment, the DAS 150 uses the one or more information services (e.g., white pages, yellow pages, search engine searches (e.g., Google, Yahoo, MSN, etc.) public databases, private databases, etc.) used to search for information about the caller's telephone number and/or the erroneous/unavailable number. The information is collected from the one or more information sources external to the telephony network, such as those available on the Internet and other computer networks, white pages listing, yellow pages listing, business directory listings, and one or more information sources internal to the telephony network such as telephony subscriber information and subscriber billing information.

Alternatively, in at least one embodiment, an erroneous call is detected by a switch within the PSTN 132, and rather than automatically routing the erroneous caller to the intercept system 140, the switch automatically routes the erroneous caller to the DAS 150 without the involvement of an intercept system such as the AIS 140 (as represented by the dashed lines in FIG. 1). In this case, the DAS 150 may be considered both a directory assistance service and an intercept system.

A variety of mechanisms for automatically routing telephones calls within a telephone network are known to those skilled in the art, and any of these methods can be utilized in accordance with the present invention. For example, a Signaling System 7 (SS7) switching mechanism or a Dual Tone Multifrequency (DMTF) switching mechanism can be utilized to route the erroneous call to a new destination (i.e., the DAS 150).

Although the AIS 140 and the DAS 150 are illustrated in FIG. 1 as separate entities, in at least one embodiment, the functionality of the AIS 140 and the DAS 150 may be integrated into a single entity adapted to provide both erroneous call interception as well as directory assistance to erroneous callers.

In addition to, or instead of, simply informing an erroneous caller of the status of the dialed number (e.g., a recorded message that the call has been disconnected, etc.), the DAS 150 can be adapted to provide one or more related services to the erroneous caller. In one embodiment, the DAS 150 is adapted to provide one or more alternate numbers associated with the unavailable number. For example, if a subscriber moved and, as a result, disconnected its telephone service from one number and reconnected to another telephone number, the DAS 150 could search a database for the new number of the subscriber and provide it to the caller as an alternative. Additional information could be provided regarding the subscriber, such as the previous or current address of the subscriber, the date of the termination of service for the dialed number, and the like. Likewise, the DAS 150 could be adapted to connect the caller to one or more alternate numbers obtained from the DAS 150. In a manner, subscribers may be tagged with historical data, permitting the DAS 150 to perform any number of smart functions and provide the caller with helpful options. Accordingly, even though the initial call made by the caller was to an unavailable number, the caller would not have to hang up and dial another number to reach an alternate number.

Furthermore, in at least one embodiment, the DAS 150 is adapted to search a database for other subscribers that are associated with the unavailable number due to one or more shared or similar characteristics. For example, if a caller dials the telephone number of a pizza parlor and the number is determined to be no longer in service, the DAS 150 then could identify a new number for the desired pizza parlor and/or locate another pizza parlor or other restaurant in the same locale and inform the caller of the availability of an alternate telephone number. The DAS 150 then can be adapted to automatically connect the caller to the telephone number of the other pizza parlor/restaurant. Furthermore, the DAS 150 can be adapted to provide a list of telephone numbers of a number of pizza parlors/restaurants in the same locale to the erroneous caller. The caller may then select a desired number from the list of numbers and direct the DAS 150 to automatically connect the erroneous caller to the selected telephone number.

Accordingly, although the erroneous caller may not be able to reach the original intended pizza parlor, the caller could be provided with alternatives in the same geographical region that could suit the caller's needs. As an adjunct to providing alternate numbers for the same subscriber or alternate numbers for a related subscriber, the DAS 150 can be adapted to play an advertisement, before, during, after the directory assistance information is being located and prepared for provision to the erroneous caller. Alternatively, the DAS 150 can be adapted to provide one or more advertisements without providing directory assistance. The advertisement can include a general advertisement, or the advertisement can include a targeted advertisement selected based on one or more attributes of the caller and/or the erroneous telephone number the erroneous caller is attempting to call. Referring to the pizza parlor example above, a targeted advertisement could be selected for playback to the erroneous caller based on information associated with the caller (e.g., such as whether the caller has children), based on the number dialed (e.g., a pizza parlor), the area of the origin and/or destination of the attempted phone call, and the like.

The term unavailable subscriber, as used herein, refers to a subscriber, intended person or entity, if any, directly associated with the unavailable number. The unavailable subscriber can include an unavailable or previous subscriber of the unavailable number (i.e., the disconnected subscriber) or the intended recipient can include a current subscriber of the unavailable number, such as when the number is temporarily unavailable due to a temporary malfunction at a central office. In the illustrated embodiment, the telephones 104, 106, and 110 are representative of unavailable numbers and/or intended recipients. Further, when a call is made by a caller to an unavailable number in an attempt to contact the unavailable subscriber, the unavailable subscriber can be considered as the intended recipient of the telephone call. Conversely, the terms available subscriber or alternate subscriber, as used herein, are intended to refer to a current subscriber to an available number that shares one or more characteristics with the unavailable subscriber of the unavailable number. The one or more characteristics can include, for example, a similar geographic location. Similarly, subscribers can be identified by one or more classifications, whereby the classification can includes one or more classes and/or subclasses used to describe the activity and/or type of subscriber, such as a business type and subtype of a subscriber. The telephones 102, 108 are representative of available subscribers having available telephone numbers.

To illustrate, an unavailable subscriber could include a local police department and have a classification of Government: Emergency Services: Police. However, if the telephone number to this police department were unavailable for some reason, the DAS 150 could determine an alternate subscriber having a similar or exact classification, such as a local fire department having a classification of Government: Emergency Services: Fire, since the class (Government) and the first subclass (Emergency Services) of both the unavailable subscriber and the available subscriber are the same, the DAS 150 can provide the number of the local fire department to the caller as an alternate number. Further, the DAS 150 could detect that the intended entity is a police department, that the dialed number is for whatever reason unavailable, prompt the caller with an inquiry to confirm that the caller is attempting to contact the police department, and then redirect the caller to an alternate police department close to the police department the caller is intending to contact.

It will be appreciated that an unavailable subscriber and an available subscriber often can include the same entity. To illustrate, if a subscriber were to disconnect from one telephone number, move to a new location, and subscribe to a new number, the subscriber could simultaneously be an unavailable subscriber via the disconnected number and an available subscriber via the newly connected number. Accordingly, the DAS 150 can be adapted to search for new or alternate numbers of the previous subscriber to the unavailable line, such as by searching for the subscriber's name in a database of current phone numbers.

Rather than, or in addition to, automatically determining alternate numbers based on one or more characteristics associated with the caller and/or the intended subscriber/telephone number, the DAS 150, in one embodiment, is further adapted to provide yellow pages directory services to an erroneous caller. After an erroneous call is intercepted and routed to the DAS 150, the caller can provide information to the DAS 150 indicating the name and/or type of subscriber the caller would like to contact. Based on this caller-provided information, the DAS 150 can query a directory database to identify any entries that match or are substantially similar to the information provided by the caller. The DAS 150 then can present the identified entries, if any, to the caller. The caller then may select an entry and direct the DAS 150 to connect the caller to the telephone number associated with the selected entry.

The information provided by a caller for yellow pages directory service can include a variety of information that can be used to identify subscribers in a telephone network. As with printed versions of the yellow pages telephone directory, a caller can provide information representative of a business type (such as automotive repair), a partial or full name of a business, organization, or private entity, and the like. The caller also can provide additional information to limit the scope of the search, such as a certain geographical area, certain business hours, and the like. To illustrate, assume a caller attempting to contact a car dealership that is no longer in business is routed to the DAS 150. At the DAS 150, the caller can request a yellow pages directory service and direct the DAS 150 to provide information about car dealerships in the local area by indicating car dealership as the business type to the DAS 150 and a particular car make (e.g., HONDA) as a business subtype. Accordingly, the DAS 150 can search one or more yellow pages databases to identify one or more HONDA dealerships in the local area. The DAS 150 then can provide information about the identified dealerships, such as their telephone numbers, locations, business hours, etc. Any of a variety of mechanisms may be utilized to obtain yellow pages directory service information from a caller. For example, the caller can speak directly to a human operator of the DAS 150. Alternatively, the DAS 150 can employ voice recognition software to convert the caller's speech into text, which is then parsed into search fields. The caller also could use the keyboard or keypad of the telephone device used to place the call to provide some or all of the information to the DAS 150. Although a number of exemplary mechanisms for providing information from the caller to the DAS 150 for yellow pages directory service have been discussed, those skilled in the art can develop other mechanisms using the guidelines provided herein.

Furthermore, in at least one embodiment, the system 100 is adapted to provide one or more advertisements to the erroneous caller while the caller is waiting for directory assistance, during directory assistance, or afterwards, such as while the call is being forwarded to a different telephone number. A mechanism to provide telephone advertisements is disclosed, for example, in U.S. Pat. No. 5,448,625 to Lederman. The advertisements can be inserted by routing the call to an advertisement system (not shown), which then routes the call to the DAS 150, as taught by Lederman. In this case, the advertisement system can periodically interrupt the directory assistance service and insert an advertisement. Alternatively, the call can be routed directly to the DAS 150, where the DAS 150 is further adapted to provide one or more advertisements to the caller during the directory assistance. These and other services that can be provided by the DAS 150 are discussed in greater detail with reference to FIG. 3.

Although an exemplary simplified telephone network is illustrated in FIG. 1 to describe, in general, the mechanism utilized to connect an originating telephone and a destination telephone during an attempted call, other telephone network architectures can be used in accordance with the present invention. Likewise, it will be appreciated that although the PSTN 132 typically incorporates the COs 122, 128 and the POPs 124, 126, they have been illustrated as separate entities in FIG. 1 for ease of discussion.

As illustrated in FIG. 2, an erroneous call can be intercepted and provided to a directory assistance service at any of a variety of points along the telephone network between the originating telephone device and the intended calling destination. In the illustrated embodiment, telephone 102 is the originating telephone, the telephone 104 represents an unavailable number associated with the same central office (CO 122) connected to the telephone 102. The telephone 106 represents an unavailable number associated with a CO 130, where the CO 130 can be connected to the CO 122 without the use of a long-distance carrier. The telephone 108 represents a working telephone number that can be connected to the telephone 102 via a long-distance connection. On the other hand, the telephone 110 represents an unavailable telephone associated with the CO 128 that is remote to the CO 122 (thereby necessitating a long-distance connection between the two central offices during an attempted call).

Assume that telephone 102 places a local call to the unavailable number (100) 555-0002 (telephone 104). In this case, since both the originating number of telephone 102, (100) 555-0001, and the destination number, (100) 555-0002, are managed by the same CO 122, no further switching through the PSTN 132 generally is necessary. In this case, a switch at the CO 122 attempting to generate a circuit between the telephone 102 and the telephone 104 determines that the destination number is an unavailable number. The switch then routes the call to the DAS 150, either directly or through the AIS 140. A variety of mechanisms may be used by the CO 122 to intercept the erroneous call. For example, the switch at the CO 122 could include an intercept database of the unavailable numbers connected to the CO 122. The switch could then search the intercept database for the dialed number, and if located in the database, route the call to the DAS 150 directly or via the AIS 140. Other mechanisms for intercepting calls to unavailable numbers known to those skilled in the art may be used without departing from the spirit or the scope of the present invention.

In the event that the telephone 102 places a call to the unavailable number (100) 556-0001, which is still local but connected to a different CO 130, the erroneous call can be intercepted at either the CO 122 or the CO 130. For example, the CO 122 could query the CO 130 to see if the dialed number is unavailable. If the number is unavailable, then the CO 122 could then direct the call to the DAS 150 to provide the caller with directory assistance. Alternatively, the CO 122, without knowledge of the status of the subscriber line associated with the dialed number, could then open a circuit between the CO 122 and the CO 130 for the attempted call. In this case, the CO 130 would then determine that the attempted call is an erroneous call to the unavailable number and route the call to the DAS 150 accordingly.

Since, in this case, the telephone 108 represents a working telephone number, (200) 555-0001, a call placed to this number by the telephone 102 presumably would be successful barring any failures between the CO 122 and the CO 128. A circuit would be created between the telephone 122, the local POP 124 of the long-distance carrier, the PSTN 132, the remote POP 126 of the long-distance carrier, the remote CO 128, and finally the telephone 108. However, a long-distance call placed to the telephone number (200) 555-0002 (telephone 110) would be unsuccessful since the number is unavailable in the illustrated example. Accordingly, at some point between the telephone 102 and the telephone 110, the call would be routed to the DAS 150, either directly or via the AIS 140, to provide directory assistance to the erroneous caller. The erroneous call could be intercepted at the CO 122, at the local POP 124, at some point along the PSTN 132, at the remote POP 126, and/or at the remote CO 126.

The point at which the erroneous call is intercepted and subsequently automatically routed to the DAS 150 can be based on any of a variety of factors. One factor includes the ability of an element of the system 100 to determine that the call is an erroneous call. To illustrate, the CO 122 or local POP 124 typically are unlikely to have prior knowledge that the telephone number (202) 555-0002 is unavailable, due to separation of the CO 122 and the local POP 124 from the CO 128 as well as the sheer number of subscribers connected to the PSTN 132. To have such knowledge generally would require the CO 122 to maintain a relatively large database, as well as a mechanism to update the database when the status of a subscriber changes.

However, since the CO 130 is one logical node from the CO 122, it is more feasible that the CO 122 could maintain knowledge of the unavailable numbers of the CO 130. For example, central offices typically manage about 10,000 subscriber lines (i.e., telephone lines). Assuming that no more that 10% of the subscriber lines are unavailable and that a central office is directly connected to no more than 10 other central offices, a central office would only need to manage an intercept database of around 10,000 entries (10,000 subscribers/central office*10 central offices*10% unavailable numbers). As a result, an erroneous telephone call from telephone 102 to the unavailable number (100) 555-0002 could easily be intercepted at either CO 122 or CO 130 and redirected to the DAS 150.

In the same vein, since the remote POP 126 is more local to the unavailable number, the remote POP 126 is more likely to have prior knowledge that the telephone number (200) 555-0002 is an unavailable number than either the local CO 122 or the local POP 124. However, the most feasible point to intercept an erroneous long distance call in accordance with the present invention typically includes the remote CO 128 associated with the unavailable telephone number. In this case, the CO 128 would detect that a call is being attempted to the unavailable number and route the call to the DAS 150 accordingly or the CO 128 could signal to the originating CO of the call that the number is unavailable and the originating CO could route the call to the DAS 150. Although some points are more likely to be utilized to intercept erroneous calls, any point between the originating caller and the central office associated with the unavailable number may be used to intercept erroneous calls in accordance with the present invention.

Another factor that can be used in determining the point at which an erroneous call is intercepted includes the type of directory assistance service to be provided. In at least one embodiment, the DAS 150 can include any of a variety of geographically-based directory assistance services, such as a local directory assistance service, a or regional directory assistance service, a national local directory assistance service, an international directory assistance service, and the like. The DAS 150 also can include one or more specialized directory assistance services, such as 800 directory assistance, government directory assistance, and the like. Accordingly, the point where a call is intercepted can be based on the type of directory assistance provided by the DAS 150. For example, if the DAS 150 includes a nationwide directory assistance service, the erroneous call could be intercepted and routed to the DAS 150 at any point between the originating CO and the destination CO. However, if the DAS 150 includes a local directory assistance service, the most benefit typically would be provided if the call were intercepted at the point of the PSTN 132 closest to the destination of the erroneous call. For example, if the telephone 102 were to a long-distance call to the unavailable number (200) 555-0002 and the call were intercepted at the CO 122 and provided to a local version of the DAS 150 specific to the region where the CO 122 is located, the directory assistance provided by the local DAS 150 is unlikely to be of much assistance to the caller since the dialed number is in a different locality. However, if the erroneous call were to be intercepted at the CO 128 and provided to a local version of the DAS 150 specific to the region of the CO 128, then the DAS 150 is more likely to have access to the appropriate information desired by the erroneous caller.

Likewise, the cost of the call to the DAS 150 may be considered when intercepting and routing the erroneous call. To save the customer money, an erroneous call made locally could be directed to a local version of the DAS 150, thereby avoiding a long-distance toll on the directory assistance call. Alternatively, all erroneous calls, whether local or long-distance, could be routed to a nationwide version of the DAS 150, where the telephone service provider could receive consideration in the form of a long-distance charge in exchange for providing the directory assistance to the caller.

Figure 3:
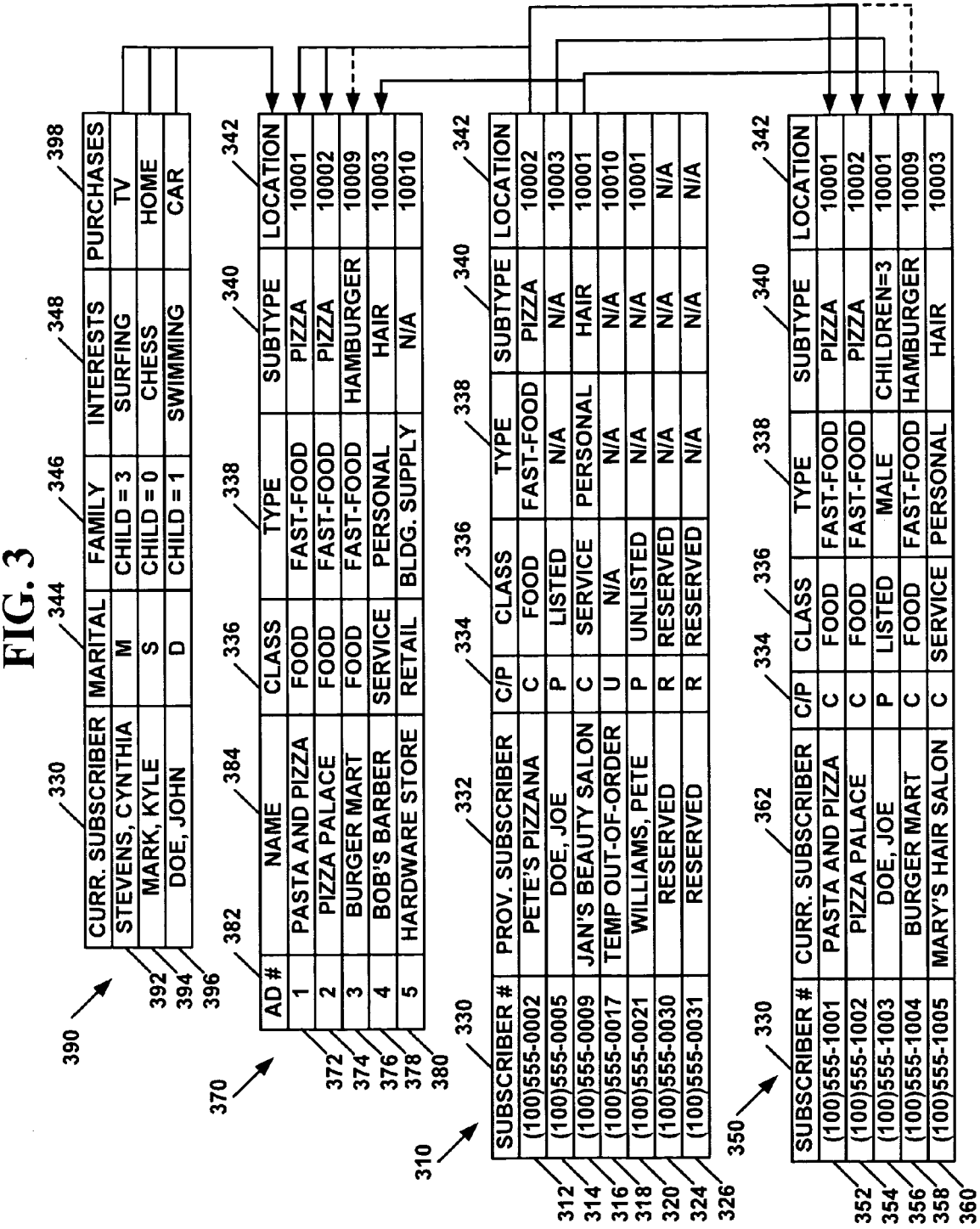
FIG. 3 is a block diagram illustrating an exemplary mechanism for providing directory assistance to a caller attempting to place an erroneous call.

Referring now to FIG. 3, various services that can be provided by the DAS 150 are illustrated in greater detail in accordance the present invention. In at least one embodiment, the DAS 150 includes, or has access to, one or more databases having information related to the telephone numbers serviced by the DAS 150, such as unavailable number database 310, available number database 350, and advertisement database 370. The DAS 150 can then utilize the information contained in these databases, as well as other databases, to inform the erroneous caller of the status of the line, provide additional information, provide alternate information, provide advertisements, and the like.

To illustrate, when an erroneous call is routed to the DAS 150, as described previously, the DAS 150 can be adapted to search the unavailable number database 310 for the unavailable number and its associated information. In the illustrated embodiment, the unavailable number database 310 includes a number of entries 312-326 each having a subscriber number field 330, an unavailable subscriber identifier field 332, a subscriber descriptor field 334, a classification field 336, a type field 338, a subtype field 340, and a location field 342, as well as other fields, as appropriate. The subscriber number field 330 includes an unavailable number and the unavailable subscriber identifier field 332 includes an identifier associated with the unavailable subscriber of the unavailable number, if any, such as a name or customer identification number. The subscriber descriptor field 334 includes a descriptor of the unavailable subscriber. In the exemplary subscriber descriptor field 334 of FIG. 3, a C indicates a commercial subscriber, a P indicates a private subscriber (i.e., a home residence), a U indicates that the unavailable subscriber information is unavailable or that the telephone number wasn't previously assigned to a subscriber, and a R indicates that the number has been reserved for some reason or another. The classification field 336 includes a classification of the subscriber, such as a restaurant (Food), a service business (Service), or if the unavailable subscriber was a non-commercial entity, if the subscriber was Listed or Unlisted. Likewise, the type field 338 and the subtype field 340 further classify the subscriber by providing subclasses of the subscriber classification. For example, the entry 312 includes an unavailable subscriber Pete's Pizza, which was a pizza parlor at one time prior to Pete's Pizza disconnecting its subscription to the telephone number (100) 555-0002. Accordingly, the type field 338 and subtype field 340 include the indicators Fast-Food and Pizza, respectively.

Should the telephone number later be reassigned to another person or business, the related information could be updated or supplemented. The location field 342 can include any of a variety of indicators of the physical location of the subscriber, such as a zip code, an area code, an address, a city name, a county name, and the like. Likewise, the location field 342 can include an indirect location identifier, such as an identifier or location of the central office to which the corresponding subscriber is connected. In the illustrated embodiment, the location field 342 includes the zip codes of the associated subscribers.

Likewise, the available number database 350, in the illustrated embodiment, includes a plurality of entries 352-360 corresponding to a plurality of available subscribers and their associated telephone numbers. As with the unavailable number database 310, the available number database 350 includes, but is not limited to, a subscriber number field 330, a subscriber descriptor field 334, a classification field 336, a type field 338, a subtype field 340, and a location field 342. Additionally, the available number database 350 includes an available subscriber identifier field 362, analogous to the unavailable subscriber field, whereby an identifier of the available subscriber, such as a name or customer code, is stored.

When an erroneous call is routed to the DAS 150, the DAS 150 can be adapted to search the unavailable number database 310 to locate information associated with the unavailable number dialed by the caller. Once the information is found, if present, the DAS 150 can provide some or all of the associated information to the caller. For example, if the caller dialed the disconnected number (100) 555-0021, the DAS 150 could find the corresponding entry 320 in the unavailable number database 310 and provide the name of the intended recipient to the caller, allowing the caller to confirm the intended destination of the call.

Additionally, in at least one embodiment, the DAS 150 is adapted to search the available subscriber database 350 to provide information relative to the unavailable number to the erroneous caller. To illustrate, assume that a caller dialed (100) 555-0005 in an attempt to reach John Doe. Since this number has, in this example, been disconnected, the erroneous call is intercepted and routed to the DAS 150. The DAS 150 then searches the unavailable number database 310 for the corresponding entry (entry 314). The DAS 150, noting the name of the intended recipient (i.e., the unavailable subscriber), searches the available number database 350 for a corresponding entry for John Doe. Finding the entry 356, the DAS 150 can provide the updated phone number for John Doe, (100) 555-1003, in the corresponding subscriber number field 330 to the caller. Likewise, the DAS 150 can be adapted to connect the caller to the updated number, either automatically or by prompting the caller in the event that the same subscriber has not subscribed to a different number, the DAS 150, in at least one embodiment, is adapted to search for one or more available subscribers similar to the unavailable subscriber and to provide information associated with the one or more available subscribers to the caller as an alternative. As discussed previously, an alternate subscriber includes a current subscriber having one or more characteristics, such as geographical location and/or subscriber classification, which are similar to the characteristics of the unavailable subscriber. For example, assume that a caller dialed (100) 555-0002 (entry 312) and was routed to the DAS 150 because this number has been disconnected. Accordingly, the DAS 150 can locate entry 312 in the unavailable number database 310 and determine that the unavailable subscriber has the classification Food: Fast Food: Pizza based on fields 336-340. Using this classification, the DAS 150 can search the available number database 350 for entries having a similar classification. In this case, entries 352 and 354 have subscribers that have classifications exactly matching the unavailable subscriber's classification. Likewise, the entry 356 includes the subscriber Burger Mart having a classification of Food: Fast Food: Hamburgers, which is similar to the classification of the intended subscriber.

In the event that one or more similarly classified entries have been located, the DAS 150 can inform the caller of the existence of alternatives to the intended subscriber and provide the information associated with one or more of the alternatives to the caller. If two or more alternatives exist, information for all of the alternatives can be provided to the caller, or a subset of alternatives could be provided based on a number of factors. For one, the alternatives chosen could be selected based on their physical proximity to the unavailable subscriber. For example, the subscriber to the telephone number (100) 555-0002 (entry 312), Pete's Pizza, was at one point in time, located in the zip code 10002 and, in this example, the Pizza Palace is located in zip code, whereas Pasta and Pizza is located in the zip code 10001. Accordingly, since Pete's Pizza (the intended recipient) and Pizza Palace (an alternate subscriber) are located in the same zip code, the DAS 150 can provide the information associated with the Pizza Palace. In a similar manner, the DAS 150 could be adapted to determine the distance between the address of an intended recipient and one or more alternate available subscribers and then provide information associated with one or more of the alternate subscribers closest to the location, prior or current, of the intended recipient (i.e., the unavailable subscriber).

Likewise, the alternate subscribers could be chosen based on the degree to which the classifications of the alternates match the classification of the unavailable subscriber. Alternatively, the subscribers could be ranked based on the size of a payment made by the subscribers to be listed in the available number database 350, and the higher ranked alternatives are provided before the lower ranked alternatives.

As discussed above, in one embodiment, the DAS 150 is adapted to provide a yellow pages directory service to an erroneous caller, where the caller provides information to the DAS 150 regarding the subscriber(s) the caller is attempting to contact. Using this information, the DAS 150 searches one or more databases, such as available subscriber database 350, for entries conforming to the caller-provided information. The information associated with the identified entry or entries can be provided to the caller, and the caller can select an entry to direct the DAS 150 to forward the caller to the telephone number associated with the selected entry. To illustrate, assume a call placed by a caller attempting to call the disconnected number for Jan's Beauty Salon (entry 316) could be intercepted and routed to the DAS 150. The DAS 150, in this case, could prompt the erroneous caller to provide information regarding the intended recipient of the call. This information could include, for example, information indicating that the caller is looking for a hair salon. This information can be conveyed to the DAS 150 by text conversion of the caller's speech, input by an human operator conversing with the caller, text input via the caller's keyboard or keypad, navigation through nested lists, and the like. To illustrate, DAS 150 could provide a listing of business types via an audio transmission and the caller could select the desired business (personal service) by pressing a number key associated with the personal service entry of the business type listing. The DAS 150 then could further narrow the search field by presenting a list personal service business. Again, the caller could refine the search by pressing the number key associated, for example, with the beauty salon of the personal service business list.

Using the caller-supplied information, the DAS 150 can search the available subscriber database 350 for one or more entries having similar characteristics. In the illustrated example, Mary's Hair Salon (entry 360) is within the parameters as defined by the caller. Accordingly, the DAS 150 can, in this example, provide information associated with Mary's Hair Salon, such as the telephone number, location, business hours, etc. The caller may then direct the DAS 150 to forward the caller to the telephone number associated with Mary's Hair Salon.

In certain instances, a caller may attempt to place a telephone call to an unavailable number that is a non-existent number, i.e., a number that is not supported by the telephone network (as discussed above). As such, it will be appreciated that there typically will be little, if any information associated with the non-existent telephone number. In such an instance, the DAS 150, noting the attempt to call a non-existent phone number, may forego attempting to identify alternate telephone numbers since there typically is no information upon which to establish such a comparison. Rather, the DAS 150 may take any of a number of actions. For one, the DAS 150 can provide directory assistance without automatically providing alternate numbers. Alternatively, the DAS 150 automatically provide yellow pages directory assistance, thereby allowing the caller to locate an alternate number by providing information regarding the caller's intended call recipient. Another action that the DAS 150 can take is to analyze historic information related to the dialed nonexistent number. For example, numerous callers could have confused an existing and available telephone with a non-existent number and then dialed the non-existent number. Accordingly, the DAS 150 can determine the number dialed most often by the callers after dialing the non-existent number and provide this number as an alternate number to subsequent callers to the non-existent number. The DAS 150 can forward the caller to a human operator, who may then assist the caller in finding the appropriate alternate number. Before, during, and/or after the performance of any of the above actions, the DAS 150 can be adapted to provide one or more advertisements to the caller.

As discussed previously, in at least one embodiment, the DAS 150 additionally is adapted to provide one or more advertisements to the caller before, during, and/or after rendering directory assistance to the caller. Accordingly, the DAS 150 can have access to one or more advertisement databases 370 having one or more entries 372-380 corresponding to available advertisements. The advertisements can include commercials, public service announcements (PSAs), information regarding certain topics, such as the weather or emergency situations, and the like. The advertisement database 370 can have an ad identification field 382, an ad name field 384, as well as the classification field 336, type field 338, subtype field 340 and location field 342, such as discussed above.

As discussed above, rather than, or in addition to, providing directory assistance, the DAS 150, in one embodiment, is adapted to provide one or more general advertisements to a caller. When a general advertisement is to be provided to the caller, the DAS 150 can select one or more of the advertisements from the advertisement database 370 based on a number of factors. In one embodiment, the advertisements are selected in a manner similar to a circular queue, whereby each advertisement is selected and played in turn. In another embodiment, the advertisements are selected based on a rank, whereby the rank of an advertisement may be determined, for example, based on the amount of consideration the provider of the DAS 150 received from the advertiser.

Alternatively, in addition to, or instead of, generalized advertisements, one or more targeted advertisements can be provided to the caller based on the properties of the erroneous call. If a caller were to call, for example, the disconnected number (100) 555-0009 in an attempt to reach Jan's Beauty Salon, the erroneous call would be intercepted and routed to the DAS 150, whereby the DAS 150 locates the number at entry 316 of the database 310. The DAS 150 can then search the database 350 for a current number for Jan's Beauty Supply or alternatives based on classification, location, and the like. In this case, an alternative can be found at entry 360 (Mary's Hair Salon) based on a match between their classifications. Accordingly, the DAS 150 can provide the telephone number for Mary's Hair Salon to the caller.

Before, during, or after this information is provided, the DAS 150 can search the advertisement database 370 for an advertisement entry related to the information desired by the caller. In this case, an advertisement having a classification that matches the classification (Service: Personal: Hair) of Jan's Beauty Salon can be found at entry 378 of the advertisement database 370 corresponding to an advertisement for Bob's Barber. Accordingly, the DAS 150 can select the advertisement for Bob's Barber and provide this message to the caller before, during, and/or after the directory assistance. Similarly, a call to the unavailable number (100) 555-0002 could result in the DAS 150 providing one or more of the advertisements for Pasta and Pizza, Pizza Palace, and Burger Mart, since their classifications match, exactly or partially, the classification of Pete's Pizzeria. Likewise, the DAS 150 can maintain, or have access to, a caller information database 390 having information associated with customers of the telephone network(s). The information associated with callers can include various types of information, such as the marital status of the caller, information regarding the caller's family, the caller's interests, recent purchases, and the like. The information in the caller information database 390 can be obtained from a third party, from surveys, census information, and the like. In the illustrated example, the caller information database 390 includes entries 392-396 having the current subscriber identification field 330, a marital status field 344, a family field 346, an interests field 348, and a recent purchases field 398. Although the above fields are illustrated, those skilled in the art may implement other/additional information fields using the guidelines provided herein.

In one embodiment, the DAS 150 can identify the caller, such as by telephone number, and locate the corresponding entry in the caller information database 390. The DAS 150 then can select one or more targeted advertisements from advertisement database 370 based at least in part on the information in the corresponding entry. For example, if Kyle Mark (entry 394) were to make an erroneous call that is intercepted and routed to the DAS 150, the DAS 150, noting that Kyle Mark recently purchased a home (based on the recent purchases field 398), could select Advertisement No. 5 (entry 380) for Hardware Store to be played to Kyle Mark, since the Hardware Store can be associated with the purchase of a home. In another example, assume that an erroneous call placed by Cynthia Stevens (entry 392) is routed to the DAS 150. The DAS 150, in this example, could note that Cynthia Stevens has three children. Based on this information, the DAS 150 could select an advertisement for a day care provider (not shown) from the advertisement database 370 to be played to Cynthia Stevens prior to directory service.

Although a number of potential services provided by the DAS 150 have been illustrated herein, other services provided by various directory assistance services may be utilized in accordance with the present invention.

In its basic called-number embodiments, the present invention replaces queries to the caller with both direct and indirect derivation of relevant subscriber data from the intercepted called number alone. Its derivation process enhances the information provided in the directory assistance process, reduces time spent in voice or menu dialogs and exchanges, and avoids the errors inherent in such dialogs and exchanges.

Figure 4A:
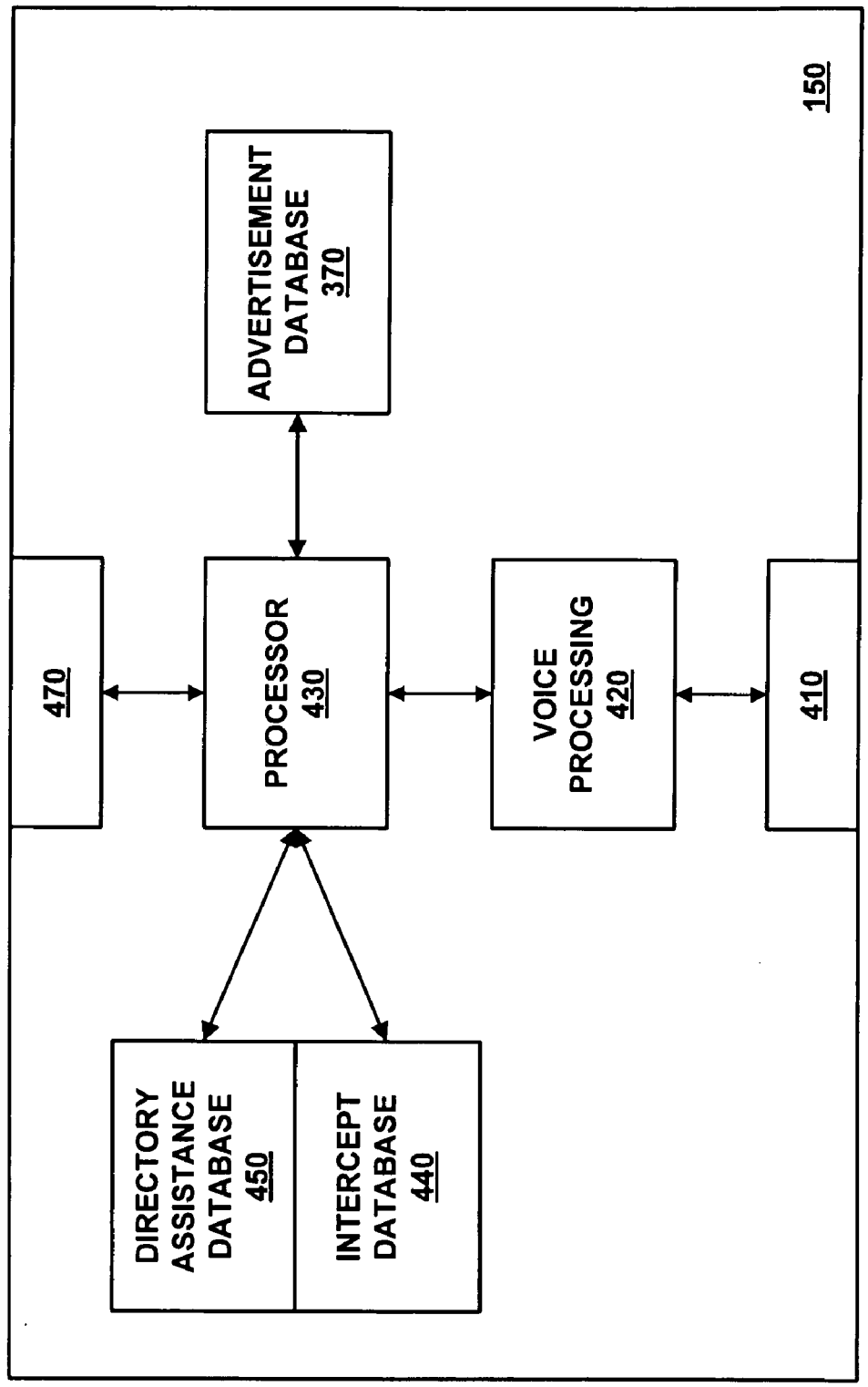
FIG. 4a is a block diagram illustrating an exemplary directory assistance service.
Figure 4B:
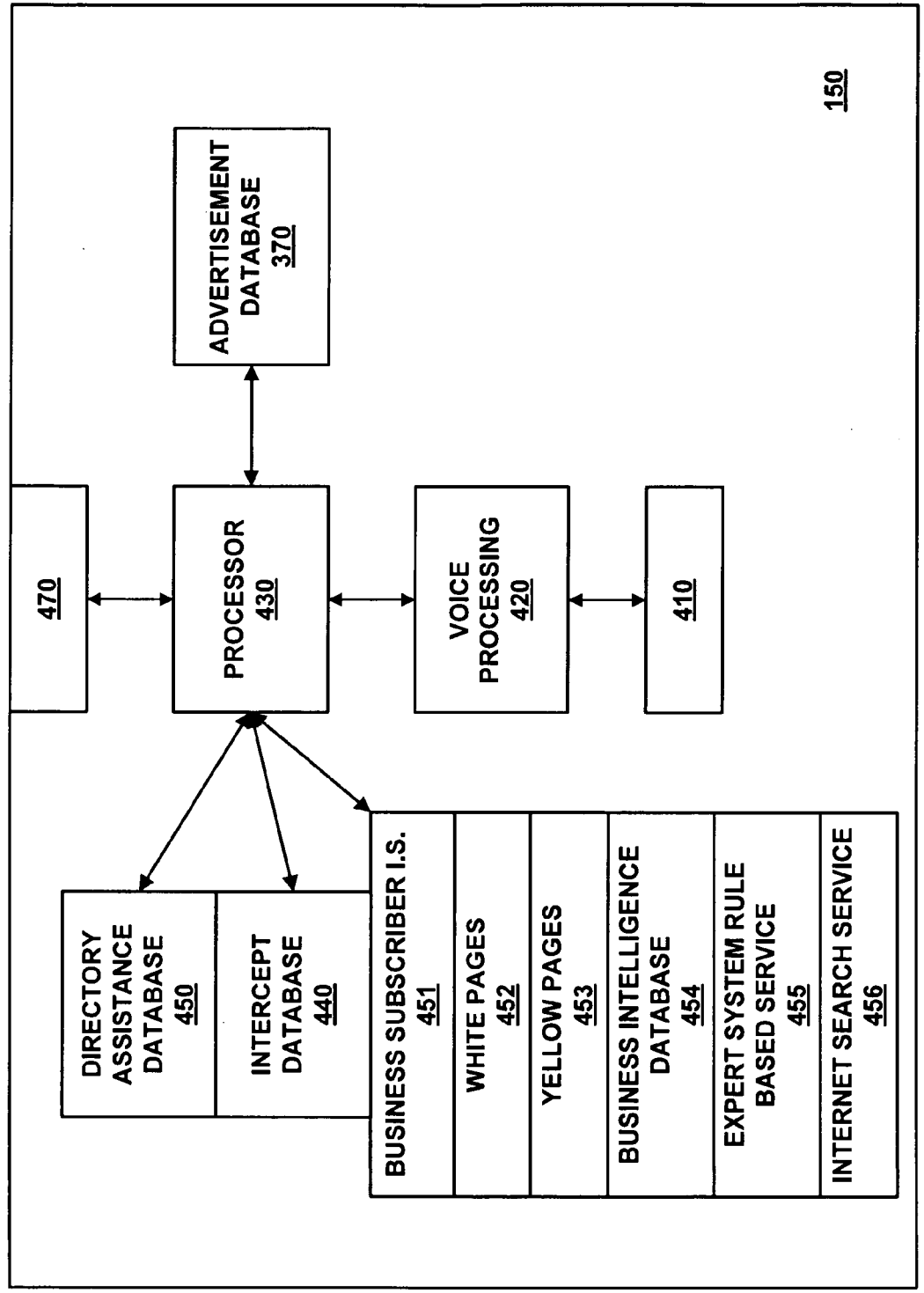
FIG. 4b is a block diagram illustrating an exemplary directory assistance service and supporting database services connected to call processing components.

Referring now to FIG. 4b for an exemplary implementation of the DAS 150 offering enhanced derived subscriber information.

In one embodiment, "Derived subscriber information" is defined as "any data element a value of which can be determined from input values available at the intercept system for an intercepted call. The input values available include the intercepted called number and, when provided in the network, the calling number. Derived subscriber information includes listing name, listing address, listing geographic location, (e.g., GeoCode, etc.) listing category or business classification, and listing call frequency.

The following description applies both to the processing of the intercepted number and to the processing of the subscriber name associated with that number as is illustrated in FIG. 4b.

FIG. 4b illustrates a DAS 150 with a business subscriber information service 451, a white page database service 452, yellow page database service 453, or a business intelligence database service 454, rule-based expert system service 455 and an Internet search service 456 including access to public and/or private Internet search engine services.

To derive the name of the subscriber represented by the intercepted number, the DAS 150 retrieves the listing name from a telephone company supplied business subscriber information service 451, a white page database service 452, yellow page database service 453, or a business intelligence database service 454, using a reverse telephone number search for the unavailable telephone number.

To derive the business classification or business category of the subscriber represented by the intercepted number, the DAS 150 retrieves the business classification or business category of the subscriber from a yellow page database service 453, or a business intelligence database service 454, using a reverse telephone number search for the unavailable telephone number.

In one embodiment, the DAS 150 includes artificial-intelligence embodiments. As is known in the arts, artificial intelligence includes hardware and software applications that have the ability to make decisions and that have the ability to learn from prior decisions and includes the reproduction of methods or results of human reasoning.

In a first artificial-intelligence embodiment, the DAS 150 obtains the business classification or business category of the subscriber using a rule-based expert system or other similar expert system 455 to derive the classification or category from the business name listed for the unavailable telephone number. An exemplary method of such derivation follows. The DAS 150: (1) derives a listing name of a subscriber represented by the unavailable telephone number, using services 451, 452, or 454 as described above, or obtains the listing name from another service; (2) uses its rule base to parse the derived listing name into significant words and phrases. In one exemplary embodiment, permuting words and retrieving synonyms for significant words are used; (3) further uses its rule base to determine one or more candidate business categories or classifications associated with the significant words and phrases; and (4) further uses its rule base to select one preferred business category or classification from among the candidates determined.

In a second artificial-intelligence embodiment, the DAS 150 obtains a business classification or business category of the subscriber using statistical data and instead in step (4) above to select one preferred business category or classification from among the candidates determined.

In a third artificial-intelligence embodiment, the DAS 150 obtains business classification or business category of the subscriber using heuristics and instead in steps (2)-(4) above, applies problem-solving techniques to analyze a listing name, determines candidate business categories, and selects one preferred business category or classification from among the candidates determined.

In an Internet-search embodiment, the DAS 150 obtains business classification or business category of the subscriber represented by the unavailable telephone number by retrieving the business category of the subscriber from an Internet search service 456 using a telephone number search for the unavailable telephone number.

In an embodiment combining artificial intelligence methods and Internet search, the DAS 150 obtains a business classification or business category of the subscriber represented by the unavailable telephone number by applying the methods of the artificial-intelligence embodiments to the listing name of the subscriber or the business classification produced by the Internet search service.

Once a business category is selected or derived from the unavailable telephone number, the invention retrieves listings in the selected or derived business category and selects one or more candidate listings from among those listings retrieved, for presentation to the caller.

To derive the address or geographic location (e.g., GeoCode) of the subscriber represented by the intercepted number, the DAS 150 retrieves an address or geographic location of the subscriber from a white page database service 452, yellow page database service 453, or a business intelligence database service 454, using a reverse telephone number search for the unavailable telephone number. Geographic location may then be used to select candidate alternative listings to be presented to a caller.

In a DAS routing embodiment, the DAS 150 uses information derived from the intercepted number, such as geographic location or business classification, to route the caller to a specific directory assistance service. Numerous directory assistance services may be available to provide service for the same or overlapping sets of related telephone numbers related by location or classification. Such routing can provide a caller with access to the best sources of information concerning a broad range of characteristics of the unavailable number called, providing for the offering of many different types of directory assistance service to the caller.

In an ANI (automated calling number identification) embodiment, the DAS 150 replaces queries to the caller with both direct and indirect derivation of relevant subscriber data from both the calling number (when available) and the intercepted called number. As for the basic called-number embodiments, the DAS 150 derivation process enhances the information provided in the directory assistance process, reduces time spent in voice or menu dialogs and exchanges, and avoids the errors inherent in such dialogs and exchanges.

Referring again to FIG. 4b for an exemplary implementation. Enhanced subscriber information for both calling number and called number is derived from services 451, 452, 453, 454, 455, and 456 as for the basic called-number embodiments.

In an enhanced intercept system storage embodiment, any or all of the subscriber information available from the services 451, 452, 453, 454, 455, and 456 of FIG. 4b may be stored in, and retrieved directly from, the intercept system itself, thereby saving intersystem traffic and offering speedier responses to the caller.

Figure 4C:
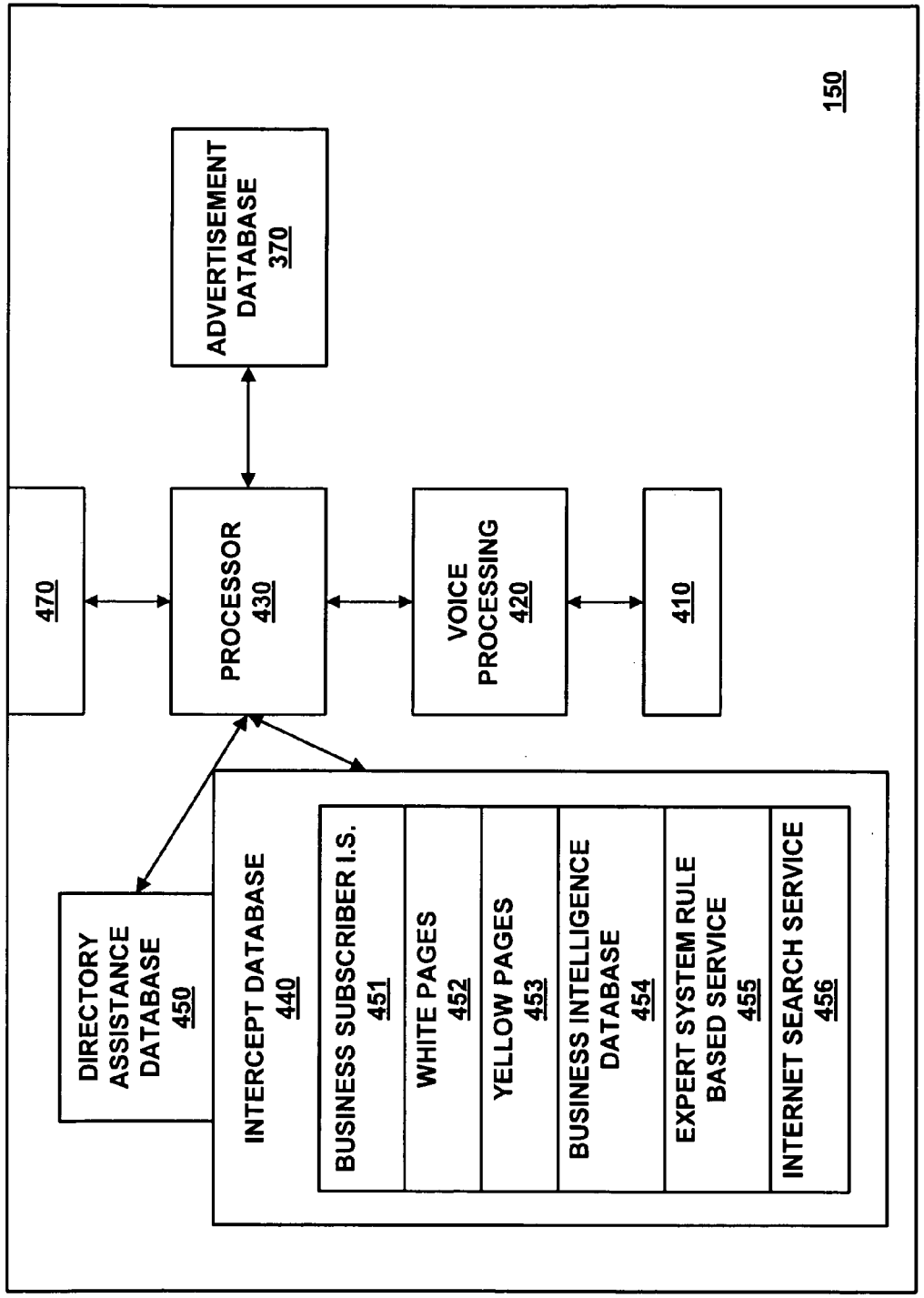
FIG. 4c is a block diagram illustrating an exemplary directory assistance service and supporting database services stored with an intercept database and connected to call processing components.

See FIG. 4c, showing the services 451, 452, 453, 454, 455, and 456 residing in the system containing the intercept database 440.

In an enhanced DA system storage embodiment, any or all of the subscriber information available from the services 451, 452, 453, 454, 455, and 456 of FIG. 4b may be stored in, and retrieved directly from, the directory assistance service or system itself, thereby saving intersystem traffic and offering speedier responses to the caller.

Figure 4D:
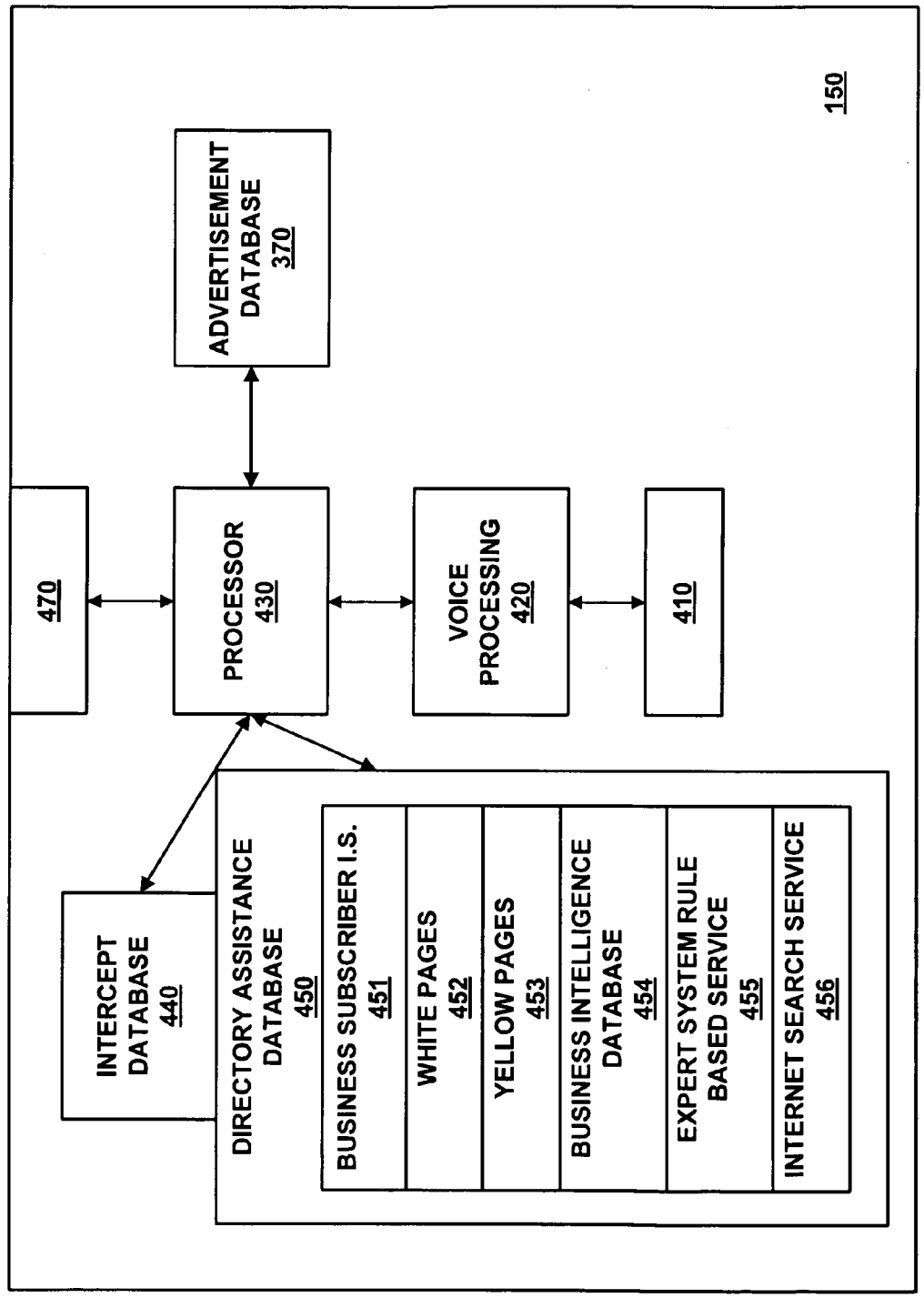
FIG. 4d is a block diagram illustrating an exemplary directory assistance service and supporting database services stored with a directory assistance database and connected to call processing components.

See FIG. 4d, which is identical to FIG. 4c except that the placement of the services 451, 452, 453, 454, 455, and 456 is now in the system containing the directory assistance database 450.

In a caller-interactive embodiment, when the DAS 150 is unable to derive necessary information for the intercepted number using reverse telephone number search from available databases, the invention sends the call to an interactive system, either interactive voice recognition or agent-based, to interact with the caller to elicit and capture necessary information for the intended number.

FIGS. 4a, 4b, 4c, and 4d all illustrate an exemplary voice processing system 420 which comprises the interactive system interacting with the caller, and an operator 470 which comprises the agent-based system interacting with the caller. The information elicited is used to provide an alternate subscriber to the caller.

In an enhanced caller-interactive embodiment, the DAS 150 stores the elicited information obtained in the basic caller-interactive embodiment in an intercept database or similar database for use by all embodiments of the present invention during later calls to the intercepted number.

The information elicited from interaction with the caller may be stored in a database in association with the intercepted number for future use during intercepted calls made to that number.

The present invention has been described as being implemented in the DAS. However, the present invention is not limited to the DAS 150 and can be implemented in other components.

Referring now to FIGS. 4a and 5, an exemplary implementation of the DAS 150 is illustrated in accordance with at least one embodiment of the present invention. Although FIG. 4a illustrates an exemplary configuration of the DAS 150 and FIG. 5 illustrates an exemplary utilization of the DAS 150, the present invention is not intended to be limited to the illustrated implementation. Accordingly, those skilled in the art can develop alternative implementations of the DAS 150, using the guidelines provided herein, without departing from the spirit or the scope of the present invention.

In the illustrated embodiment of FIG. 4a, the DAS 150 includes telephony equipment 410 to interface with a telephone network and an operator interface 470 to interface with an operator or a pool of operators. The DAS 150 further includes a voice processing module 420 adapted to convert speech received from a caller into a digital representation and to convert a digital speech data into synthesized speech for playback to the caller. The DAS 150 further includes, or has access to, an intercept database 440 and a directory assistance database 450. In embodiments wherein the DAS 150 is adapted to provide advertisements during directory assistance, the DAS 150 includes or has access to the advertisement database 370. A processor 430 is used to receive information from the caller via the interface 410 and/or the voice processing module 420, to search the intercept database 440, the directory assistance database 450 and/or the advertisement database 370, and to provide corresponding information to the caller via the voice processing module 420 and the telephony equipment 410. The processor 430 can include a microprocessor, a microcontroller, an application specific integrated circuit (ASIC), a used in the operation of the DAS 150, such as power supplies, busses, and the like, are well known and are omitted for ease of illustration.

In one embodiment, the directory assistance and at least one advertisement are selected based on referral fees paid by advertisers, businesses and one or more information service providers. In one exemplary embodiment, the directory assistance and at least one advertisement are selected in an ordering based on an amount of a referral fee paid. In another exemplary embodiment, a pre-determined method (e.g., list, first-in-first out (FIFO) queue, last-in-first-out (LIFO) queue, round-robin, etc.) is used to select the directory assistance and the at least one advertisement.

In one embodiment, entries for advertisers, businesses and one or more information service providers are located by business location and business category include businesses accepting referrals offered to callers attempting to place a telephone call to an unavailable business telephone number.

In another embodiment, the advertisers, businesses and one or more information service providers accepting referrals offered to callers attempting to place a telephone call to an unavailable business telephone number comprise businesses paying for receiving the referrals.

Figure 5A:
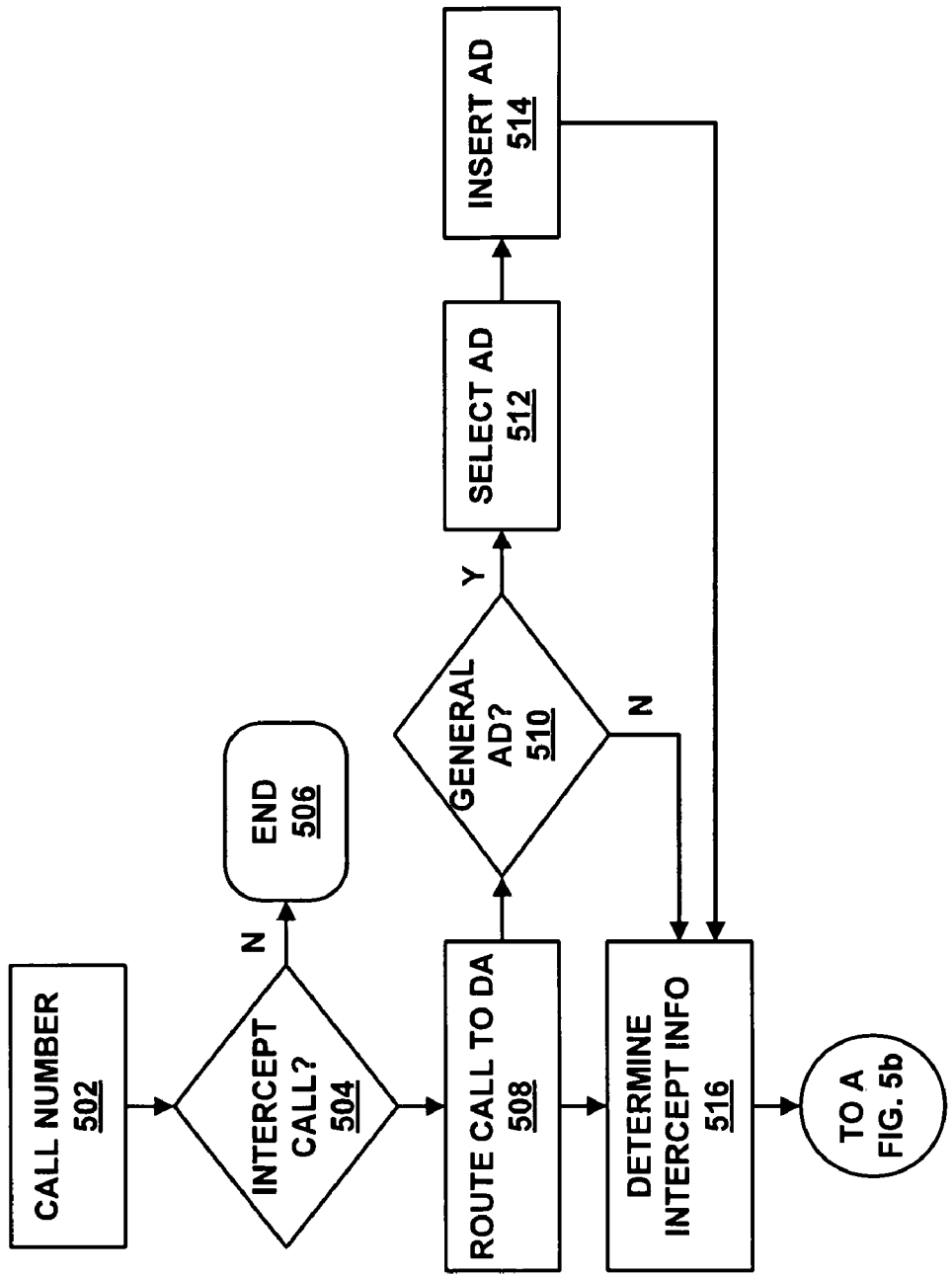

Referring now to FIG. 5a, an operation of the system 100 to intercept erroneous calls is illustrated. The method 500 initiates with step 502, wherein a caller attempts to call an intended destination at a specified number. This call can include a local call, a toll call, a long-distance call, and the like. At step 504, an element of the PSTN 132 determines if the number dialed is disconnected, out-of-service, not installed, or otherwise unavailable. As discussed previously, the determination of whether the call is to be intercepted can occur at the local central office, at a point-of-presence of a long-distance carrier, at a remote central office and the like, based on the properties of the call, such as a local call versus a long-distance call. If the call is to a valid number, a circuit is completed between the originating telephone and the landing, or destination, telephone and the call commences at step 506.

In the event that the dialed number is unavailable, the method 500 proceeds to step 508, wherein the call is intercepted and routed to the DAS 150. As discussed previously, the call can be intercepted by the AIS 140 and then automatically routed by the AIS 140 to the DAS 150, the call can be routed directly to the DAS 150, or the DAS 150 can also implement the functionality of the AIS 140 in addition to providing directory assistance. The call is received by DAS 150 at the telephony equipment 410. The telephony equipment 410 can receive various properties of the call from the telephone network, such as the dialed and originating telephone numbers from an automatic number indicator (ANI) or operator number indicator (ONI) connected to the DAS 150.

At step 510, it is determined if the DAS 150 is to provide general advertising before, during, or after providing directory assistance to the caller. In the event that the DAS 150 is not adapted to provide general advertising or general advertising is not desired, then the method 500 proceeds to step 516. Otherwise, the processor 430 selects one or more general ads from the advertising database 370. As discussed previously, the selected general advertisement(s) can be selected from a circular queue, selected based on compensation received from the advertisers, and the like. At step 514 the selected advertisement or advertisements are inserted before the DAS 150 provides directory assistance to the caller. Alternatively, the selected advertisement(s) can be inserted during or after the directory assistance.

At step 516, the processor 430 utilizes the properties of the erroneous call to search the intercept database 440 for the entry related to the unavailable number. The intercept database 440 can include the unavailable number database 310 of FIG. 3. In this case, the processor 430 can find the entry corresponding to the dialed number to determine the status of the number, the unavailable subscriber, the address of the unavailable subscriber, the classification of the unavailable subscriber, and the like. In FIG. 5b at step 518, the addition of targeted advertisement based on unavailable subscriber information is evaluated. If the DAS 150 is not adapted to insert targeted advertisements or targeted advertising not desired, the method 500 continues to step 524.

Otherwise, the processor 430 selects one or more targeted advertisements from the advertisement database 310 based on the information gleaned from the entry in the intercept database 440. As discussed previously, in one embodiment, a targeted advertisement is selected based on a comparison of its classification to the classification of the unavailable subscriber. At step 522, the targeted advertisement(s) are inserted before, during, and/or after providing directory assistance to the caller.

At step 524, the processor 430 accesses, either directly or via operator input via the operator interface 470, the directory assistance database 450, where the directory assistance database can include a number of databases, such as geographical subscriber information databases, specialized telephone information databases, toll-free databases and the like. For example, in at least one embodiment, the directory assistance database 450 includes the available number database 350 of FIG. 3. In this case, the processor 430 can search the available number database 350 for one or more entries that have elements in common with the unavailable subscriber associated with the unavailable number. For example, the processor 430 can search for a new number of the unavailable subscriber. Likewise, the processor 430 can search for available subscribers that have the same or a similar classification and mark such entries.

At step 526, the processor 430 formats some or all of the corresponding information associated with the erroneous call into data representative of a speech sequence and provides the speech data to the voice processing module 420, whereupon the data may be converted into synthesized speech and played over the telephone system to the caller. Alternatively, the information could be presented to an operator, and the operator could relay the information to the caller.

Additionally, at the step 526, the DAS 150 could interact with the caller to further specify the desired information. For example, if the processor 430 finds three entries in the directory assistance database having classifications that match exactly the classification of the dialed number, the processor 430, via the voice processor module 420, could query the caller as to which entry the caller would prefer. The caller could then reply via the phone, where the caller's audible reply is converted to a digital signal by the voice processing module 420 and provided to the processor 430 for interpretation. Alternatively, the caller could interact by pressing keys on the telephone used by the caller, and the resulting tones or signals could be interpreted by the DAS 150.

At step 528, the DAS 150, in one embodiment, queries the caller to see if the information provided was adequate or to discern if additional assistance is desired. This query can be performed by requesting an input from the caller, or requesting the caller wait for additional assistance. If the caller requires additional assistance or information, the caller can be routed to an operator at step 530 for additional assistance. The operator then can attempt to locate any additional information requested by the caller, and provide the additional information to the caller at step 526. If the information provided is adequate or if the caller terminates the call, the directory assistance call terminates at step 532, whereupon the circuit between the caller's telephone and the DAS 150 is made available to other circuits.

It will be appreciated that at least one implementation of the present invention results in a decrease in the effort expended by a caller to locate an intended subscriber or alternate subscriber when an erroneous call is made. In one embodiment, the service provider implementing the present invention can charge the erroneous caller a modest fee in exchange for the directory assistance service and/or some additional services. For example, prior to being routed to the DAS 150, the AIS 140 could playback a recorded message to the caller informing the caller that the call is being routed to directory assistance and that a fee will be charged for this service and then prompt the customer with the option to continue or to disconnect the call. Similarly, the caller could be prompted to choose to listen to one or more advertisements in exchange for the directory assistance, or a combination of advertising and a fee could be selected by the caller in exchange for directory assistance.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

We claim:

1. A system for deriving information associated with an unavailable telephone number or subscriber and providing said information to a caller attempting to place a telephone call to said unavailable telephone number, the system comprising in combination:

an intercept system coupled to a directory assistance service, wherein the intercept system intercepts the telephone call on a telephony network to the unavailable number before initiating any action by the telephony network back to the caller, wherein the unavailable number includes non-existent numbers or numbers not implemented on the telephony network;

the directory assistance service; and one or more information services coupled to the directory assistance service, wherein the one or more information services includes a rule-based expert system service coupled to the directory assistance system, wherein the direct assistance service uses the one or more information services to search for information about the unavailable number and the caller's number to provide additional information and advertising to the caller from the one or more information sources external to the telephony network and one or more information sources internal to the telephony network.

2. The system of claim 1, wherein the intercept system coupled to the directory assistance service includes a system comprising in combination:

for intercepting the telephone call made to the unavailable telephone number;

for routing the telephone call to the directory assistance service; and for providing at least one advertisement to the caller.

3. The system of claim 1, wherein a plurality of the one or more information services is coupled to the intercept system.

4. The system of claim 1, wherein a plurality of the one or more information services resides within the intercept system.

5. A method of deriving information from an unavailable telephone number and subscriber, the method comprising:

detecting telephone call to an unavailable number on a telephony network initiated by a caller;

intercepting the telephone call on the telephony network to the unavailable number before initiating any action by the telephony network back to the caller, wherein the unavailable number includes non-existent numbers or numbers not implemented on the telephony network;

retrieving the caller's telephone number;

automatically routing the detected and intercepted telephone call to an automatic intercept system associated with a directory assistance service;

automatically routing the detected and intercepted telephone call from the automatic intercept system to the directory assistance service wherein a rule-based expert system service is coupled to the directory assistance service;

providing directory assistance back to the caller;

determining information associated with the telephone call; and providing at least one advertisement to the caller from the directory assistance service.

6. The A non-transitory computer readable medium having stored therein a plurality of software instructions for causing one or more processors to execute the steps of: detecting telephone call to an unavailable number on a telephony network initiated by a caller;

intercepting the telephone call on the telephony network to the unavailable number before initiating any action by the telephony network back to the caller, wherein the unavailable number includes non-existent numbers or numbers not implemented on the telephony network;

retrieving the caller's telephone number;

automatically routing the detected and intercepted telephone call to an automatic intercept system associated with a directory assistance service;

automatically routing the detected and intercepted telephone call from the automatic intercept system to the directory assistance service wherein a rule-based expert system service is coupled to the directory assistance service;

providing directory assistance back to the caller;

determining information associated with the telephone call; and providing at least one advertisement to the caller from the directory assistance service.

7. The method of claim 5, wherein the step of determining information associated with the telephone call further comprises the steps of:

determining information associated with the telephone number;

determining information associated with the unavailable telephone number; and determining information associated with the combination of the telephone number and the unavailable telephone number.

8. The method of claim 5, wherein the step of determining information from the unavailable telephone number includes the step of deriving the listing name of the subscriber represented by the telephone number.

9. The method of claim 8, wherein the step of deriving information from the unavailable telephone number includes the step of deriving the business category of the subscriber represented by the unavailable telephone number.

10. The method of claim 5, wherein the step of deriving information from the telephone number includes the step of deriving the business category of the subscriber represented by the unavailable telephone number.

11. The method of claim 10, wherein the step of deriving one or more business categories associated with the listing name words and phrases includes the step of applying logical rules from a rule base with the rule-based expert system service to the listing name words and phrases.

12. The method of claim 10, wherein the step of deriving one or more business categories associated with the listing name words and phrases includes the step of applying statistical rules from compiled statistics with the rule-based expert system service to the listing name words and phrases.

13. The method of claim 10, wherein the step of deriving one or more business categories associated with the listing name words and phrases includes the step of applying heuristics rule-based expert system service to the listing name words and phrases.

14. The method of claim 7, wherein the step of determining information from the unavailable telephone number includes the step of deriving the location of the subscriber represented by the unavailable telephone number.

15. The method of claim 14, wherein the step of deriving the location of the subscriber represented by the unavailable telephone number includes the step of using a reverse telephone number search for the unavailable telephone number to retrieve the subscriber location from a service selected from the group consisting of:

a white page database service;

a yellow pages database service;

a business intelligence database service; and a service providing telephone company supplied business subscriber information.

16. The method of claim 14, wherein the step of deriving the location of the subscriber represented by the unavailable telephone number includes the step of deriving the address of the subscriber represented by the unavailable telephone number.

17. The method of claim 14, wherein the step of deriving the location of the subscriber represented by the unavailable telephone number includes the step of deriving the geographic code (GeoCode) of the subscriber represented by the unavailable telephone number.

* * * * *